(12) United States Patent
Hoss et al.

(10) Patent No.: US 12,431,735 B2
(45) Date of Patent: Sep. 30, 2025

(54) ASYMMETRIC SPIRAL ANTENNAS WITH PARASITIC ELEMENTS FOR WIRELESS POWER TRANSMISSION

(71) Applicant: Energous Corporation, San Jose, CA (US)

(72) Inventors: Alister Hoss, Phoenix, AZ (US); Evangelos Kornaros, Santa Cruz, CA (US)

(73) Assignee: ENERGOUS CORPORATION, San Jose, CA (US)

( * ) Notice: Subject to any disclaimer, the term of this patent is extended or adjusted under 35 U.S.C. 154(b) by 531 days.

(21) Appl. No.: 17/700,337

(22) Filed: Mar. 21, 2022

(65) Prior Publication Data

US 2022/0209579 A1    Jun. 30, 2022

Related U.S. Application Data

(63) Continuation of application No. PCT/US2020/051695, filed on Sep. 19, 2020.
(Continued)

(51) Int. Cl.
*H02J 50/10*    (2016.01)
*H02J 50/00*    (2016.01)
(Continued)

(52) U.S. Cl.
CPC ............ *H02J 50/10* (2016.02); *H02J 50/001* (2020.01); *H02J 50/20* (2016.02); *H02J 50/402* (2020.01); *H02J 50/80* (2016.02)

(58) Field of Classification Search
CPC .......... H02J 50/10; H02J 50/001; H02J 50/20; H02J 50/402; H02J 50/80; H02J 7/00034;
(Continued)

(56) References Cited

U.S. PATENT DOCUMENTS 787,412 A    4/1905 Tesla
2,811,624 A    10/1957 Haagensen
(Continued)

FOREIGN PATENT DOCUMENTS

CN    201278367 Y    7/2009
CN    102227884 A    10/2011
(Continued)

OTHER PUBLICATIONS

Energous Corporation, Extended European Search Report, EP Patent Application No. 20909157.8, Sep. 15, 2023, 9 pgs.
(Continued)

*Primary Examiner* — M Baye Diao
(74) *Attorney, Agent, or Firm* — Perkins Coie LLP; Colin Fowler

(57) ABSTRACT

A near-field charging system for wirelessly charging electronic devices using electromagnetic energy having a low frequency is provided. The near-field charging system comprises: (A) a transmitting antenna comprising: a first substrate; and a first antenna, coupled to the first substrate, that follows a first meandering pattern having a first length, wherein the transmitting antenna has a first port impedance, and (B) a receiving antenna comprising: a second substrate; and a second antenna, coupled to the second substrate, that follows a second meandering pattern having a second length, wherein: (i) the second length is less than the first length, and (ii) the receiving antenna has a second port impedance that is less than the first port impedance. The transmitting antenna is configured to transmit electromagnetic energy having a frequency at or below 60 MHz to the receiving antenna at an efficiency above 90%.

19 Claims, 20 Drawing Sheets
(8 of 20 Drawing Sheet(s) Filed in Color)

Related U.S. Application Data

(60) Provisional application No. 62/907,244, filed on Sep. 27, 2019, provisional application No. 62/903,680, filed on Sep. 20, 2019.

(51) Int. Cl.
   *H02J 50/20* (2016.01)
   *H02J 50/40* (2016.01)
   *H02J 50/80* (2016.01)

(58) Field of Classification Search
   CPC .. H02J 50/40; H02J 50/23; H04B 5/79; H04B 5/26; H04B 5/43
   USPC .......................................................... 320/108
   See application file for complete search history.

(56) References Cited

U.S. PATENT DOCUMENTS

| | | |
|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,142,292 A | 8/1992 | Chang |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,176,433 B1 | 1/2001 | Uesaka et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,012,572 B1 | 3/2006 | Schaffner et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 10/2013 | Song et al. |
| 8,558,661 B2 | 10/2013 | Zeine |
| 8,560,026 B2 | 10/2013 | Chanterac |
| 8,564,485 B2 | 10/2013 | Milosavljevic et al. |
| 8,604,746 B2 | 12/2013 | Lee |
| 8,614,643 B2 | 12/2013 | Leabman |
| 8,621,245 B2 | 12/2013 | Shearer et al. |

(56) References Cited

U.S. PATENT DOCUMENTS

| | | |
|---|---|---|
| 8,626,249 B2 | 1/2014 | Kuusilinna et al. |
| 8,629,576 B2 | 1/2014 | Levine |
| 8,653,966 B2 | 2/2014 | Rao et al. |
| 8,655,272 B2 | 2/2014 | Saunamäki |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hi |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leabman |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,502,923 B2 * | 11/2016 | Kim ............... H02J 50/80 |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,531,444 B2 * | 12/2016 | Bae ............... H02M 7/46 |
| 9,532,748 B2 | 1/2017 | Denison et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,080 B2 | 10/2017 | Leabman et al. |
| 9,800,172 B1 | 10/2017 | Leabman |
| 9,806,564 B2 | 10/2017 | Leabman |
| 9,819,230 B2 | 11/2017 | Petras et al. |
| 9,824,815 B2 | 11/2017 | Leabman et al. |
| 9,825,674 B1 | 11/2017 | Leabman |
| 9,831,718 B2 | 11/2017 | Leabman et al. |
| 9,838,083 B2 | 12/2017 | Bell et al. |
| 9,843,201 B1 | 12/2017 | Leabman et al. |
| 9,843,213 B2 | 12/2017 | Leabman et al. |
| 9,843,229 B2 | 12/2017 | Leabman |
| 9,843,763 B2 | 12/2017 | Leabman et al. |
| 9,847,669 B2 | 12/2017 | Leabman |
| 9,847,677 B1 | 12/2017 | Leabman |
| 9,847,679 B2 | 12/2017 | Bell et al. |
| 9,853,361 B2 | 12/2017 | Chen et al. |
| 9,853,692 B1 | 12/2017 | Bell et al. |
| 9,859,756 B2 | 1/2018 | Leabman et al. |
| 9,859,758 B1 | 1/2018 | Leabman |
| 9,866,279 B2 | 1/2018 | Bell et al. |
| 9,867,032 B2 | 1/2018 | Verma et al. |
| 9,867,062 B1 | 1/2018 | Bell et al. |
| 9,871,301 B2 | 1/2018 | Contopanagos |
| 9,876,379 B1 | 1/2018 | Leabman et al. |
| 9,876,380 B1 | 1/2018 | Leabman et al. |
| 9,876,394 B1 | 1/2018 | Leabman |
| 9,876,536 B1 | 1/2018 | Bell et al. |
| 9,876,648 B2 | 1/2018 | Bell |
| 9,882,394 B1 | 1/2018 | Bell et al. |
| 9,882,427 B2 | 1/2018 | Leabman et al. |
| 9,887,584 B1 | 2/2018 | Bell et al. |
| 9,887,739 B2 | 2/2018 | Leabman et al. |
| 9,891,669 B2 | 2/2018 | Bell |
| 9,893,554 B2 | 2/2018 | Bell et al. |
| 9,893,555 B1 | 2/2018 | Leabman et al. |
| 9,893,564 B2 | 2/2018 | de Rochemont |
| 9,899,744 B1 | 2/2018 | Contopanagos et al. |
| 9,899,844 B1 | 2/2018 | Bell et al. |
| 9,899,861 B1 | 2/2018 | Leabman et al. |
| 9,899,873 B2 | 2/2018 | Bell et al. |
| 9,906,065 B2 | 2/2018 | Leabman et al. |
| 9,906,275 B2 | 2/2018 | Leabman |
| 9,912,199 B2 | 3/2018 | Leabman et al. |
| 9,916,485 B1 | 3/2018 | Lilly et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,941,747 B2 | 4/2018 | Bell et al. |
| 9,941,754 B2 | 4/2018 | Leabman et al. |
| 9,948,135 B2 | 4/2018 | Leabman et al. |
| 9,954,374 B1 | 4/2018 | Bell et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,008,777 B1 | 6/2018 | Broyde et al. |
| 10,008,875 B1 | 6/2018 | Leabman |
| 10,008,889 B2 | 6/2018 | Bell et al. |
| 10,014,728 B1 | 7/2018 | Leabman |
| 10,027,159 B2 | 7/2018 | Hosseini |
| 10,038,337 B1 | 7/2018 | Leabman et al. |

(56) References Cited

U.S. PATENT DOCUMENTS

| | | |
|---|---|---|
| 10,050,462 B1 | 8/2018 | Leabman et al. |
| 10,056,782 B1 | 8/2018 | Leabman |
| 10,063,064 B1 | 8/2018 | Bell et al. |
| 10,063,105 B2 | 8/2018 | Leabman |
| 10,063,106 B2 | 8/2018 | Bell et al. |
| 10,068,703 B1 | 9/2018 | Contopanagos |
| 10,075,008 B1 | 9/2018 | Bell et al. |
| 10,079,515 B2 | 9/2018 | Hosseini et al. |
| 10,090,699 B1 | 10/2018 | Leabman |
| 10,090,714 B2 | 10/2018 | Bohn et al. |
| 10,090,886 B1 | 10/2018 | Bell et al. |
| 10,103,552 B1 | 10/2018 | Leabman et al. |
| 10,103,582 B2 | 10/2018 | Leabman et al. |
| 10,110,046 B1 | 10/2018 | Esquibel et al. |
| 10,122,219 B1 | 11/2018 | Hosseini et al. |
| 10,122,415 B2 | 11/2018 | Bell et al. |
| 10,124,754 B1 | 11/2018 | Leabman |
| 10,128,686 B1 | 11/2018 | Leabman et al. |
| 10,128,693 B2 | 11/2018 | Bell et al. |
| 10,128,695 B2 | 11/2018 | Leabman et al. |
| 10,128,699 B2 | 11/2018 | Leabman |
| 10,134,260 B1 | 11/2018 | Bell et al. |
| 10,135,112 B1 | 11/2018 | Hosseini |
| 10,135,286 B2 | 11/2018 | Hosseini et al. |
| 10,135,294 B1 | 11/2018 | Leabman |
| 10,135,295 B2 | 11/2018 | Leabman |
| 10,141,768 B2 | 11/2018 | Leabman et al. |
| 10,141,771 B1 | 11/2018 | Hosseini et al. |
| 10,141,791 B2 | 11/2018 | Bell et al. |
| 10,148,097 B1 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Bell |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,056 B2 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 10,333,332 B1 | 6/2019 | Hosseini |
| 10,355,534 B2 | 7/2019 | Johnston et al. |
| 10,381,880 B2 | 8/2019 | Leabman et al. |
| 10,389,161 B2 | 8/2019 | Hosseini et al. |
| 10,396,588 B2 | 8/2019 | Leabman |
| 10,396,604 B2 | 8/2019 | Bell et al. |
| 10,439,442 B2 | 10/2019 | Hosseini et al. |
| 10,439,448 B2 | 10/2019 | Bell et al. |
| 10,447,093 B2 | 10/2019 | Hosseini |
| 10,476,312 B2 | 11/2019 | Johnston et al. |
| 10,483,768 B2 | 11/2019 | Bell et al. |
| 10,490,346 B2 | 11/2019 | Contopanagos |
| 10,491,029 B2 | 11/2019 | Hosseini |
| 10,498,144 B2 | 12/2019 | Leabman et al. |
| 10,511,097 B2 | 12/2019 | Kornaros et al. |
| 10,511,196 B2 | 12/2019 | Hosseini |
| 10,516,289 B2 | 12/2019 | Leabman et al. |
| 10,516,301 B2 | 12/2019 | Leabman |
| 10,523,033 B2 | 12/2019 | Leabman |
| 10,523,058 B2 | 12/2019 | Leabman |
| 10,554,052 B2 | 2/2020 | Bell et al. |
| 10,594,165 B2 | 3/2020 | Hosseini |
| 10,615,647 B2 | 4/2020 | Johnston et al. |
| 10,680,319 B2 | 6/2020 | Hosseini et al. |
| 10,714,984 B2 | 7/2020 | Hosseini et al. |
| 10,734,717 B2 | 8/2020 | Hosseini |
| 10,778,041 B2 | 9/2020 | Leabman |
| 10,790,674 B2 | 9/2020 | Bell et al. |
| 10,840,743 B2 | 11/2020 | Johnston et al. |
| 10,848,853 B2 | 11/2020 | Leabman et al. |
| 10,879,740 B2 | 12/2020 | Hosseini |
| 10,923,954 B2 | 2/2021 | Leabman |
| 10,958,095 B2 | 3/2021 | Leabman et al. |
| 10,965,164 B2 | 3/2021 | Leabman et al. |
| 10,985,617 B1 | 4/2021 | Johnston et al. |
| 10,992,185 B2 | 4/2021 | Leabman |
| 10,992,187 B2 | 4/2021 | Leabman |
| 11,011,942 B2 | 5/2021 | Liu |
| 11,018,779 B2 | 5/2021 | Sarajedini |
| 11,056,929 B2 | 7/2021 | Bell et al. |
| 11,114,885 B2 | 9/2021 | Hosseini et al. |
| 11,159,057 B2 | 10/2021 | Kabiri et al. |
| 11,233,425 B2 | 1/2022 | Leabman |
| 11,245,191 B2 | 2/2022 | Kornaros et al. |
| 12,155,231 B2 * | 11/2024 | Hoss .................. H02J 50/23 |
| 2002/0065052 A1 | 5/2002 | Pande et al. |
| 2002/0103447 A1 | 8/2002 | Terry |
| 2002/0171594 A1 | 11/2002 | Fang |
| 2003/0038750 A1 | 2/2003 | Chen |
| 2003/0058187 A1 | 3/2003 | Billiet et al. |
| 2004/0020100 A1 | 2/2004 | O'Brian et al. |
| 2004/0130425 A1 | 7/2004 | Dayan et al. |
| 2004/0130442 A1 | 7/2004 | Breed |
| 2004/0145342 A1 | 7/2004 | Lyon |
| 2004/0155832 A1 | 8/2004 | Yuanzhu |
| 2004/0207559 A1 | 10/2004 | Milosavljevic |
| 2004/0259604 A1 | 12/2004 | Mickle et al. |
| 2005/0007276 A1 | 1/2005 | Barrick et al. |
| 2005/0116683 A1 | 6/2005 | Cheng |
| 2005/0117660 A1 | 6/2005 | Vialle et al. |
| 2005/0134517 A1 | 6/2005 | Gottl |
| 2005/0227619 A1 | 10/2005 | Lee et al. |
| 2005/0237258 A1 | 10/2005 | Abramov et al. |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0160517 A1 | 7/2006 | Yoon |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0284593 A1 | 12/2006 | Nagy et al. |
| 2007/0007821 A1 | 1/2007 | Rossetti |
| 2007/0019693 A1 | 1/2007 | Graham |
| 2007/0021140 A1 | 1/2007 | Keyes |

(56) References Cited

U.S. PATENT DOCUMENTS

| | | |
|---|---|---|
| 2007/0060185 A1 | 3/2007 | Simon et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0122297 A1 | 5/2008 | Arai |
| 2008/0123383 A1 | 5/2008 | Shionoiri |
| 2008/0169910 A1 | 7/2008 | Greene et al. |
| 2008/0197802 A1 | 8/2008 | Onishi |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0174604 A1 | 7/2009 | Keskitalo |
| 2009/0200985 A1 | 8/2009 | Zane et al. |
| 2009/0206791 A1 | 8/2009 | Jung |
| 2009/0207092 A1 | 8/2009 | Nysen et al. |
| 2009/0218884 A1 | 9/2009 | Soar |
| 2009/0218891 A1 | 9/2009 | McCollough |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0281678 A1 | 11/2009 | Wakamatsu |
| 2009/0284082 A1 | 11/2009 | Mohammadian |
| 2009/0284220 A1 | 11/2009 | Toncich et al. |
| 2009/0284227 A1 | 11/2009 | Mohammadian et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0312046 A1 | 12/2009 | Clevenger et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019908 A1 | 1/2010 | Cho et al. |
| 2010/0033021 A1 | 2/2010 | Bennett |
| 2010/0034238 A1 | 2/2010 | Bennett |
| 2010/0044123 A1 | 2/2010 | Perlman et al. |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0087227 A1 | 4/2010 | Francos et al. |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213770 A1* | 8/2010 | Kikuchi ............... H01Q 1/248 307/104 |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0309088 A1 | 12/2010 | Hyvonen et al. |
| 2010/0315045 A1 | 12/2010 | Zeine |
| 2010/0328044 A1 | 12/2010 | Waffenschmidt et al. |
| 2011/0009057 A1 | 1/2011 | Saunamäki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0057607 A1 | 3/2011 | Carobolante |
| 2011/0057853 A1 | 3/2011 | Kim et al. |
| 2011/0062788 A1 | 3/2011 | Chen et al. |

(56) References Cited

U.S. PATENT DOCUMENTS

| | | |
|---|---|---|
| 2011/0062916 A1* | 3/2011 | Farahani .............. H02J 50/90 320/108 |
| 2011/0074342 A1 | 3/2011 | MacLaughlin |
| 2011/0074349 A1 | 3/2011 | Ghovanloo |
| 2011/0109167 A1 | 5/2011 | Park et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133691 A1 | 6/2011 | Hautanen |
| 2011/0151789 A1 | 6/2011 | Viglione et al. |
| 2011/0154429 A1 | 6/2011 | Stantchev |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0227725 A1 | 9/2011 | Muirhead |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Pappu |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 7/2012 | Huggins et al. |
| 2012/0188142 A1 | 7/2012 | Shashi et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |
| 2012/0306572 A1 | 12/2012 | Hietala et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |

(56) References Cited

U.S. PATENT DOCUMENTS

| | | |
|---|---|---|
| 2013/0002550 A1 | 1/2013 | Zalewski |
| 2013/0005252 A1 | 1/2013 | Lee et al. |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008993 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0111153 A1 | 4/2014 | Kwon et al. |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |

(56) References Cited

U.S. PATENT DOCUMENTS

| | | |
|---|---|---|
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375258 A1 | 12/2014 | Arkhipenkov |
| 2014/0375261 A1 | 12/2014 | Manova-Elssibony et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0021990 A1 | 1/2015 | Myer et al. |
| 2015/0022008 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102764 A1 | 4/2015 | Leabman et al. |
| 2015/0102769 A1 | 4/2015 | Leabman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0236877 A1 | 8/2015 | Peng et al. |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |

(56) References Cited

U.S. PATENT DOCUMENTS

| | | |
|---|---|---|
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333573 A1 | 11/2015 | Leabman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0341087 A1 | 11/2015 | Moore et al. |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013661 A1 | 1/2016 | Kurs et al. |
| 2016/0013677 A1 | 1/2016 | Bell et al. |
| 2016/0013855 A1 | 1/2016 | Campos |
| 2016/0020636 A1 | 1/2016 | Khlat |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |
| 2016/0043571 A1 | 2/2016 | Kesler et al. |
| 2016/0043572 A1 | 2/2016 | Cooper et al. |
| 2016/0054440 A1 | 2/2016 | Younis |
| 2016/0056635 A1 | 2/2016 | Bell |
| 2016/0056640 A1 | 2/2016 | Mao |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099614 A1 | 4/2016 | Leabman et al. |
| 2016/0099755 A1 | 4/2016 | Leabman et al. |
| 2016/0099757 A1 | 4/2016 | Leabman et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0174162 A1 | 6/2016 | Nadakuduti et al. |
| 2016/0181849 A1 | 6/2016 | Govindaraj |
| 2016/0181867 A1 | 6/2016 | Daniel et al. |
| 2016/0181873 A1 | 6/2016 | Mitcheson et al. |
| 2016/0197522 A1 | 7/2016 | Zeine et al. |
| 2016/0202343 A1 | 7/2016 | Okutsu |
| 2016/0204642 A1 | 7/2016 | Oh |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0063168 A1 | 3/2017 | Uchida |
| 2017/0077733 A1 | 3/2017 | Jeong et al. |
| 2017/0077765 A1 | 3/2017 | Bell et al. |
| 2017/0077979 A1 | 3/2017 | Papa et al. |
| 2017/0085437 A1 | 3/2017 | Condeixa et al. |
| 2017/0092115 A1 | 3/2017 | Sloo et al. |
| 2017/0110886 A1 | 4/2017 | Reynolds et al. |
| 2017/0110910 A1 | 4/2017 | Zeine et al. |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0214422 A1 | 7/2017 | Na et al. |
| 2017/0274787 A1 | 9/2017 | Salter et al. |
| 2017/0338695 A1 | 11/2017 | Port |
| 2018/0006611 A1 | 1/2018 | de Jong et al. |
| 2018/0040929 A1 | 2/2018 | Chappelle |
| 2018/0048178 A1 | 2/2018 | Leabman |
| 2018/0090992 A1 | 3/2018 | Shrivastava et al. |
| 2018/0262050 A1 | 9/2018 | Yankowitz |
| 2018/0301934 A1 | 10/2018 | Prabhala et al. |
| 2018/0309314 A1 | 10/2018 | White et al. |
| 2018/0343040 A1 | 11/2018 | Luzinski et al. |
| 2018/0375368 A1 | 12/2018 | Leabman et al. |
| 2019/0052979 A1 | 2/2019 | Chen et al. |
| 2019/0074862 A1 | 3/2019 | Wang et al. |
| 2019/0131827 A1 | 5/2019 | Johnston |
| 2019/0296586 A1 | 9/2019 | Moshfeghi |
| 2019/0326782 A1 | 10/2019 | Graham et al. |
| 2019/0386522 A1 | 12/2019 | Park et al. |
| 2019/0393729 A1 | 12/2019 | Contopanagos et al. |
| 2019/0393928 A1 | 12/2019 | Leabman |
| 2020/0091608 A1 | 3/2020 | Alpman et al. |
| 2020/0112204 A1 | 4/2020 | Hosseini et al. |
| 2020/0153117 A1 | 5/2020 | Papio-Toda et al. |
| 2020/0235614 A1 | 7/2020 | Swan et al. |
| 2020/0244104 A1 | 7/2020 | Katajamaki et al. |
| 2020/0244111 A1 | 7/2020 | Johnston et al. |
| 2020/0274397 A1 | 8/2020 | Hwang et al. |

FOREIGN PATENT DOCUMENTS

| | | | |
|---|---|---|---|
| CN | 102292896 A | 12/2011 | |
| CN | 102800944 A | * 11/2012 | ............... H01Q 1/38 |
| CN | 102860037 A | 1/2013 | |
| CN | 103151848 A | 6/2013 | |
| CN | 103348563 A | 10/2013 | |
| CN | 203826555 U | 9/2014 | |
| CN | 104090265 A | 10/2014 | |
| CN | 104167773 A | 11/2014 | |
| CN | 104347915 A | 2/2015 | |
| CN | 105765821 A | 7/2016 | |
| CN | 106329116 A | 1/2017 | |
| CN | 103380561 B | 9/2017 | |
| DE | 20016655 U1 | 2/2002 | |
| DE | 102013216953 A1 | 2/2015 | |
| EP | 1028482 A2 | 8/2000 | |
| EP | 1081506 A1 | 3/2001 | |
| EP | 2346136 A1 | 7/2011 | |
| EP | 2397973 A1 | 2/2012 | |
| EP | 2545635 A2 | 1/2013 | |
| EP | 2747195 A1 | 6/2014 | |
| EP | 3067983 A1 | 9/2016 | |
| EP | 3118970 A1 | 1/2017 | |
| EP | 3145052 A1 | 3/2017 | |
| GB | 2404497 A | 2/2005 | |
| GB | 2556620 A | 6/2018 | |

(56) References Cited

FOREIGN PATENT DOCUMENTS

| | | | |
|---|---|---|---|
| JP | 2000323916 A | 11/2000 | |
| JP | 2002319816 A | 10/2002 | |
| JP | 2006157586 A | 6/2006 | |
| JP | 2007043432 A | 2/2007 | |
| JP | 2008167017 A | 7/2008 | |
| JP | 2009525715 A | 7/2009 | |
| JP | 2009201328 A | 9/2009 | |
| JP | 2010183811 A * | 8/2010 | ............ B60L 53/122 |
| JP | 2012016171 A | 1/2012 | |
| JP | 2012095226 A | 5/2012 | |
| JP | 2012157167 A | 8/2012 | |
| JP | 2013099249 A | 5/2013 | |
| JP | 2013162624 A | 8/2013 | |
| JP | 2014075927 A | 4/2014 | |
| JP | 2014112063 A | 6/2014 | |
| JP | 2014176131 A | 9/2014 | |
| JP | 2015027345 A | 2/2015 | |
| JP | 2015128349 A | 7/2015 | |
| JP | 2015128370 A | 7/2015 | |
| JP | WO2015177859 A1 | 4/2017 | |
| KR | 20060061776 A | 6/2006 | |
| KR | 20070044302 A | 4/2007 | |
| KR | 100755144 B1 | 9/2007 | |
| KR | 20110132059 A | 12/2011 | |
| KR | 20110135540 A1 | 12/2011 | |
| KR | 20120009843 A | 2/2012 | |
| KR | 20120108759 A | 10/2012 | |
| KR | 20130026977 A | 3/2013 | |
| KR | 20140023409 A | 2/2014 | |
| KR | 20140023410 A | 3/2014 | |
| KR | 20140085200 A | 7/2014 | |
| KR | 20150077678 A | 7/2015 | |
| RU | 2658332 C1 | 6/2018 | |
| WO | WO 199508125 A1 | 3/1995 | |
| WO | WO 199831070 A1 | 7/1998 | |
| WO | WO 199952173 A1 | 10/1999 | |
| WO | WO 2000111716 A1 | 2/2001 | |
| WO | WO 2003091943 A1 | 11/2003 | |
| WO | WO 2004077550 A1 | 9/2004 | |
| WO | WO 2006122783 A2 | 11/2006 | |
| WO | WO 2007070571 A2 | 6/2007 | |
| WO | WO 2008024993 A2 | 2/2008 | |
| WO | WO 2008156571 A2 | 12/2008 | |
| WO | WO 2010022181 A1 | 2/2010 | |
| WO | WO 2010039246 A1 | 4/2010 | |
| WO | WO 2010138994 A1 | 12/2010 | |
| WO | WO 2011112022 A2 | 9/2011 | |
| WO | WO 2012177283 A1 | 12/2012 | |
| WO | WO 2013031988 A1 | 3/2013 | |
| WO | WO 2013035190 A1 | 3/2013 | |
| WO | WO 2013038074 A2 | 3/2013 | |
| WO | WO 2013042399 A1 | 3/2013 | |
| WO | WO 2013052950 A1 | 4/2013 | |
| WO | WO 2013105920 A2 | 7/2013 | |
| WO | WO 2013175596 A1 | 11/2013 | |
| WO | WO 2014068992 A1 | 5/2014 | |
| WO | WO 2014075103 A1 | 5/2014 | |
| WO | WO 2014113093 A1 | 7/2014 | |
| WO | WO 2014132258 A1 | 9/2014 | |
| WO | WO 2014134996 A1 | 9/2014 | |
| WO | WO 2014182788 A2 | 11/2014 | |
| WO | WO 2014182788 A3 | 11/2014 | |
| WO | WO 2014197472 A1 | 12/2014 | |
| WO | WO 2014209587 A1 | 12/2014 | |
| WO | WO 2015038773 A1 | 3/2015 | |
| WO | WO 2015097809 A1 | 7/2015 | |
| WO | WO 2015130902 A1 | 9/2015 | |
| WO | WO 2015161323 A1 | 10/2015 | |
| WO | WO 2016024869 A1 | 2/2016 | |
| WO | WO 2016048512 A1 | 3/2016 | |
| WO | WO 2016088261 A1 | 6/2016 | |
| WO | WO 2016187357 A1 | 11/2016 | |
| WO | WO 2017112942 A1 | 6/2017 | |

OTHER PUBLICATIONS

Energous Corp., IPRP, PCT/US2014/040697, Dec. 8, 2015, 9 pgs.
Energous Corp., IPRP, PCT/US2014/040705, Dec. 8, 2015, 6 pgs.
Energous Corp., IPRP, PCT/US2014/045119, Jan. 12, 2016, 9 pgs.
Energous Corp., IPRP, PCT/US2014/048002, Feb. 12, 2015 8 pgs.
Energous Corp., IPRP, PCT/US2014/049669, Feb. 9, 2016, 8 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/068282, Jun. 7, 2016, 10 pgs.
Energous Corp., IPRP, PCT/US2014/068586, Jun. 14, 2016, 8 pgs.
Energous Corp., IPRP, PCT/US2015/067242, Jun. 27, 2017, 8 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068551, Jun. 26, 2018, 6 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2018/031786, Apr. 14, 2020, 7 pgs.
Energous Corp., IPRP, PCT/US2018/039334, Dec. 24, 2019, 8 pgs.
Energous Corp., IPRP, PCT/US2018/051082, Mar. 17, 2020, 9 pgs.
Energous Corp., IPRP, PCT/US2018/058178, May 5, 2020, 7 pgs.
Energous Corp., IPRP, PCT/US2019/015820, Aug. 4, 2020, 7 pgs.
Energous Corp., IPRP, PCT/US2019/021817, Sep. 15, 2020, 7 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.

(56) References Cited

OTHER PUBLICATIONS

Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Order Granting Reexamination Request, App No. 90/013,793 Aug. 31, 2016, 23 pgs.
*Ossia Inc.* vs *Energous Corp.*, PGR2016-00023-Institution Decision, Nov. 29, 2016, 29 pgs.
*Ossia Inc.* vs *Energous Corp.*, PGR2016-00024-Institution Decision, Nov. 29, 2016, 50 pgs.
*Ossia Inc.* vs *Energous Corp.*, PGR2016-00024-Judgement-Adverse, Jan. 20, 2017, 3 pgs.
Notice of Intent to Issue Reexam Certificate: 90/013,793 Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.

(56) References Cited

OTHER PUBLICATIONS

Adamiuk et al., "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al., "A System for Change Detection and Human Recognition in Voxel Space using the Microsoft Kinect Sensor," 2011 IEEE Applied Imagery Pattern Recognition Workshop. 8 pgs.
Han et al., Enhanced Computer Vision with Microsoft Kinect Sensor: A Review, IEEE Transactions on Cybernetics vol. 43, No. 5., pp. 1318-1334, Oct. 3, 2013.
Hsieh et al., "Development of a Retrodirective Wireless Microwave Power Transmission System", IEEE, 2003, pp. 393-396.
Leabman, "Adaptive Band-partitioning for Interference Cancellation in Communication System," Thesis Massachusetts Institute of Technology, Feb. 1997, pp. 1-70.
Li et al., "High-Efficiency Switching-Mode Charger System Design Considerations with Dynamic Power Path Management," Mar./Apr. 2012 Issue, 8 pgs.
Mao et al., "BeamStar: An Edge-Based Approach to Routing in Wireless Sensors Networks", IEEE Transactions on Mobile Computing, IEEE Service Center, Los Alamitos, CA, vol. 6, No. 11, Nov. 1, 2007, 13 pgs.
Mascarenas et al., "Experimental Studies of Using Wireless Energy Transmission for Powering Embedded Sensor Nodes," Nov. 28, 2009, Journal of Sound and Vibration, 13 pgs.
Mishra et al., "SIW-based Slot Array Antenna and Power Management Circuit for Wireless Energy Harvesting Applications", IEEE APSURSI, Jul. 2012, 2 pgs.
Nenzi et al., "U-Helix: On-Chip Short Conical Antenna", 7th European Conference on Antennas and Propagation (EUCAP), ISBN: 978-1-4673-2187-7, IEEE, Apr. 8, 2013, 5 pgs.
Qing et al., "UHF Near-Field Segmented Loop Antennas with Enlarged Interrogation Zone," 2012 IEEE International Workshop on Antenna Technology (iWAT), Mar. 1, 2012, pp. 132-135, XP055572059, ISBN: 978-1-4673-0035-3.
Singh, "Wireless Power Transfer Using Metamaterial Bonded Microstrip Antenna for Smart Grid WSN", 4th International Conference on Advances in Computing and Communications (ICACC), Aug. 27-29, 2014, 1 pg.
Smolders, "Broadband Microstrip Array Antennas", Institute of Electrical and Electronics Engineers, Digest of the Antennas and Propagation Society International Symposium, Seattle, WA, Jun. 19-24, 1994, 3 pgs.
Van Veen et al., "Beamforming: A Versatile Approach to Spatial Filtering", IEEE, ASSP Magazine, Apr. 1988, pp. 4-24.
Wei et al., "Design of a Wideband Horizontally Polarized Omnidirectional Printed Loop Antenna," IEEE Antennas and Wireless Propagation Letters, vol. 11, Jan. 3, 2012, 4 pgs.
Zeng et al., "A Compact Fractal Loop Rectenna for RF Energy Harvesting," IEEE Antennas and Wireless Propagation Letters, vol. 16, Jun. 26, 2017, 4 pgs.
Zhai et al., "A Practical Wireless Charging System Based on Ultra-Wideband Retro-Reflective Beamforming", 2010 IEEE Antennas and Propagation Society International Symposium, Toronto, ON, 2010, 4 pgs.

\* cited by examiner

Transmitting Antenna 110

Receiving Antenna 124

ASYMMETRIC SPIRAL ANTENNAS WITH PARASITIC ELEMENTS FOR WIRELESS POWER TRANSMISSION

RELATED APPLICATIONS

This application is a continuation of PCT Application No. PCT/US20/51695, filed Sep. 19, 2020, entitled "Asymmetric Spiral Antennas With Parasitic Elements For Wireless Power Transmission," which claims priority to U.S. Provisional Application Ser. No. 62/903,680, filed Sep. 20, 2019, entitled "Asymmetric Spiral Antennas With Parasitic Element For Wireless Power Transmission," and to U.S. Provisional Application Ser. No. 62/907,244, filed Sep. 27, 2019, entitled "Asymmetric Spiral Antennas With Parasitic Elements For Wireless Power Transmission." Each of these related applications is fully incorporated herein by reference in its respective entirety.

TECHNICAL FIELD

The present disclosure relates generally to wireless power transmission, and more particularly to spiral antennas used for near-field power transmission and reception.

BACKGROUND

Portable electronic devices such as smartphones, tablets, notebooks and other electronic devices have become a necessity for communicating and interacting with others. The frequent use of portable electronic devices, however, uses a significant amount of power, which quickly depletes the batteries attached to these devices. Inductive charging pads and corresponding inductive coils in portable devices allow users to wirelessly charge a device by placing the device at a particular position on an inductive pad to allow for a contact-based charging of the device due to magnetic coupling between respective coils in the inductive pad and in the device.

Conventional inductive charging pads, however, suffer from many drawbacks. For one, users typically must place their devices at a specific position and in a certain orientation on the charging pad because gaps ("dead zones" or "cold zones") exist on the surface of the charging pad. In other words, for optimal charging, the coil in the charging pad needs to be aligned with the coil in the device in order for the required magnetic coupling to occur. Additionally, placement of other metallic objects near an inductive charging pad may interfere with operation of the inductive charging pad. Thus, even if the user places their device at the exact right position, if another metal object is also on the pad, then magnetic coupling still may not occur and the device will not be charged by the inductive charging pad. This results in a frustrating experience for many users as they may be unable to properly charge their devices. Also, inductive charging requires a relatively large receiver coil to be placed within a device to be charged, which is less than ideal for devices where internal space is at a premium.

Charging using electromagnetic radiation (e.g., microwave radiation waves) offers promise. In these systems, however, problems arising from misalignment still persist (e.g., misalignment between the receiving antenna and the transmitting antenna, in some instances, can result in an efficiency of the system dropping significantly). Moreover, these systems could benefit from transmitting and receiving antenna designs that do not require matching port impedances to function at a high efficiency.

SUMMARY

Accordingly, there is a need for wireless charging systems that address the problems identified above. To this end, transmitting and receiving antennas are described herein that (i) mitigate problems arising from the misalignment of the receiving antenna and the transmitting antenna (e.g., when wireless charging using electromagnetic radiation at a near-field distance) and (ii) have mismatched port impedances but can nevertheless operate at a high efficiency (e.g., efficiency greater than 90%).

(A1) In accordance with some embodiments, a near-field charging system for wirelessly charging electronic devices using electromagnetic energy having a low frequency (e.g., at or below 60 MHz) is provided. The near-filed charging system includes a transmitting antenna comprising: (i) a first substrate, and (ii) a first antenna, coupled to the first substrate, that follows a first meandering pattern having a first length, wherein the transmitting antenna has a first port impedance. The near-filed charging system also includes a receiving antenna comprising: (i) a second substrate, and (ii) a second antenna, coupled to the second substrate, that follows a second meandering pattern having a second length, whereby: (a) the second length is less than the first length, and (b) the receiving antenna has a second port impedance that is less than the first port impedance. Moreover, the transmitting antenna is configured to transmit electromagnetic energy having a low frequency at or below 60 MHz to the receiving antenna at an efficiency above 90%. Furthermore, the receiving antenna is coupled to power-conversion circuitry for converting the electromagnetic energy into usable power for charging or powering an electronic device that is coupled to the receiving antenna and the power-conversion circuitry.

(A2) In some embodiments of A1, the first meandering pattern is a first spiral pattern with a first number of revolutions, and the second meandering pattern is a second spiral pattern with a second number of revolutions. The second number of revolutions is less than the first number of revolutions.

(A3) In some embodiments of A2, the first spiral pattern is a planar rectangular spiral, and the second spiral pattern is a planar rectangular spiral. In other embodiments, the first spiral pattern is a planar circular spiral, and the second spiral pattern is a planar circular spiral (or some other spiral shape).

(A4) In some embodiments of any of A1-A3, the transmitting antenna further comprises a first via configured to feed radio frequency (RF) signals to the first antenna. Moreover, the receiving antenna further comprises a second via configured to transfer energy harvested by the second antenna to the power-conversion circuitry.

(A5) In some embodiments of A4, the first via is positioned at a center of the first substrate while the second via is offset in at least one direction from a center of the second substrate.

(A6) In some embodiments of any of A1-A5, the first substrate has a first thickness, and the second substrate has a second thickness that is less than the first thickness.

(A7) In some embodiments of any of A1-A6, the first antenna has a first width, and the second antenna has a second width that is greater than the first width.

(A8) In some embodiments of A7, the first antenna comprises a first plurality of antenna elements, and at least one antenna element of the first plurality of antenna elements has a third width that is less than the first width.

(A9) In some embodiments of A8, the second antenna comprises a second plurality of antenna elements, and at least one antenna element of the second plurality of antenna elements has a fourth width that is less than the second width and greater than the third width.

(A10) In some embodiments of any of A1-A9, the transmitting antenna is configured to transmit electromagnetic energy having a frequency between 30 MHz and 50 MHz.

(A11) In some embodiments of A10, the transmitting antenna is configured to transmit electromagnetic energy having a frequency at 40 MHz.

(A12) In some embodiments of any of A1-A11, the second substrate includes opposing first and second surfaces, whereby the second antenna is coupled to the first surface, and the receiving antenna further comprises a parasitic element, coupled to the second surface of the second substrate, shaped to reduce the receiving antenna's sensitivity to misalignment with the transmitting antenna. Put another way, the parasitic antenna is adapted to, according to a design of the parasitic antenna (i.e., a shape of the parasitic antenna), disrupt energy field distributions around the receiving antenna.

(A13) In some embodiments of A12, the receiving antenna is configured to: (i) harvest electromagnetic energy having a frequency at or below 60 MHz at an efficiency above 90% when aligned center-to-center with the transmitting antenna, and (ii) harvest electromagnetic energy having a frequency at or below 60 MHz at an efficiency above 85% when misaligned center-to-center with the corresponding transmitting antenna by approximately 5 mm.

(A14) In some embodiments of any of A12-A13, the parasitic element includes a layer of copper.

(A15) In some embodiments of any of A12-A14, the layer of copper is rectangular or circular shaped.

(B1) In another aspect, a near-field charging system for wirelessly charging electronic devices using electromagnetic energy having a low frequency is provided. The near-field charging system includes: (i) a transmitting antenna having a first antenna that follows a first meandering pattern, and (ii) a receiving antenna having a second antenna that follows a second meandering pattern, whereby the second meandering pattern is different from the first meandering pattern. Furthermore, the transmitting antenna is configured to transmit electromagnetic energy having a frequency at or below 60 MHz to the receiving antenna at an efficiency above 90% and, moreover, the receiving antenna is coupled to power-conversion circuitry for converting the electromagnetic energy into usable power for charging or powering an electronic device that is coupled to the receiving antenna and the power-conversion circuitry.

(B2) The near-field charging system includes the structural characteristics for the near-field charging system described above in any of A2-A15.

(C1) In yet another aspect, a near-field charging system for wirelessly charging electronic devices using electromagnetic energy having a low frequency is provided. The near-field charging system includes a pair of asymmetric antennas, including: (i) a transmitting antenna and (ii) a receiving antenna. Furthermore, the transmitting antenna is configured to transmit electromagnetic energy having a frequency at or below 60 MHz to the receiving antenna at an efficiency above 90% and, moreover, the receiving antenna is coupled to power-conversion circuitry for converting the electromagnetic energy into usable power for charging or powering an electronic device that is coupled to the receiving antenna and the power-conversion circuitry.

(C2) In some embodiments of C1, an antenna of the transmitting antenna follows a first spiral pattern with a first number of revolutions, and an antenna of the receiving antenna follows a second spiral pattern with a second number of revolutions, the second number of revolutions being less than the first number of revolutions.

(C3) In some embodiments of any of C1-C2, the transmitting antenna includes a first via and the receiving antenna includes a second via. Moreover, when the transmitting antenna is aligned with the receiving antenna, the first via and the second via are axially misaligned.

(C4) In some embodiments of any of C1-C3, the pair of asymmetric antennas terminate with different port impedances.

(C5) In some embodiments of any of C1-C4, the transmitting antenna has a port impedance of approximately 50 ohms, and the receiving antenna has a port impedance of approximately 5 ohms.

(C6) The near-field charging system includes the structural characteristics for the near-field charging system described above in any of A2-A15.

(D1) In another aspect, a wireless power receiver for wirelessly charging electronic devices using electromagnetic energy having a low frequency is provided. The wireless power receiver includes a receiving antenna comprising an antenna, coupled to a substrate, that follows a meandering pattern having a length, whereby: (i) the length of the antenna is less than a length of an antenna of a paired transmitting antenna, and (ii) the receiving antenna has a port impedance that is less than a port impedance of the paired transmitting antenna. Furthermore, the transmitting antenna is configured to transmit electromagnetic energy having a frequency at or below 60 MHz to the receiving antenna at an efficiency above 90% and, moreover, the receiving antenna is coupled to power-conversion circuitry for converting the electromagnetic energy into usable power for powering an electronic device that is coupled to the power-conversion circuitry.

(D2) The wireless power receiver includes the structural characteristics for the receiving antenna described above in any of A1-A15.

(E1) In another aspect, a wireless power transmitter for wirelessly charging electronic devices using electromagnetic energy having a low frequency is provided. The wireless power transmitter includes a transmitting antenna comprising an antenna, coupled to a substrate, that follows a meandering pattern having a length, whereby: (i) the length of the antenna is greater than a length of an antenna of a paired receiving antenna, and (ii) the paired receiving antenna has a port impedance that is less than a port impedance of the transmitting antenna. Furthermore, the transmitting antenna is configured to transmit electromagnetic energy having a frequency at or below 60 MHz to the receiving antenna at an efficiency above 90% and, moreover, the receiving antenna is coupled to power-conversion circuitry for converting the electromagnetic energy into usable power for powering an electronic device that is coupled to the power-conversion circuitry.

(E2) The wireless power transmitter includes the structural characteristics for the transmitting antenna described above in any of A1-A15.

(F1) In yet another aspect, a receiving antenna for wirelessly charging electronic devices using electromagnetic energy is provided. The receiving antenna includes: (i) a circuit board, forming a bottom surface of the receiving antenna, that includes power-conversion circuitry, (ii) a ground plane, positioned on top of and electrically isolated from the circuit board, that defines a first opening, (iii) a parasitic element, positioned on top of and electrically isolated from the ground plane, that defines a second opening, and (iv) an antenna element, positioned on top of and electrically isolated from the parasitic element, that follows a spiral pattern, the antenna element forming a top surface of the receiving antenna. Moreover, the parasitic antenna is shaped to reduce the receiving antenna's sensitivity to misalignment with a corresponding transmitting antenna.

Put another way, the parasitic antenna is adapted to, according to a design of the parasitic antenna (i.e., a shape of the parasitic antenna), disrupt energy field distributions around the receiving antenna (e.g., to reduce the receiving antenna's sensitivity to misalignment with a corresponding transmitting antenna). In doing so, the parasitic antenna imparts a degree of movability/mobility to the receiving antenna (or more generally to the near-field charging system), meaning that the receiving antenna and the corresponding transmitting antenna can transfer energy, wirelessly, with a high degree of efficiency (e.g., greater than 80%) even when the receiving antenna and the corresponding transmitting antenna are not perfectly aligned center-to-center (e.g., the receiving antenna and the corresponding transmitting antenna can transfer energy wirelessly with a high degree of efficiency with a center-to-center misalignment of, e.g., one inch).

(F2) In some embodiments of F1, the first and second openings are concentric. Furthermore, in some embodiments, the circuit board also includes an opening, which is concentric with the first and second openings.

(F3) In some embodiments of any of F1-F2, (i) the receiving antenna is configured to harvest electromagnetic energy having a frequency at or below 60 MHz at an efficiency above 90% when aligned center-to-center with the corresponding transmitting antenna, and (ii) the receiving antenna is configured to harvest electromagnetic energy having a frequency at or below 60 MHz at an efficiency above 85% when misaligned center-to-center with the corresponding transmitting antenna by approximately 5 mm.

(F4) In some embodiments of any of F1-F3, the parasitic element includes a layer of copper.

(F5) In some embodiments of F4, the layer of copper is rectangular or circular shaped.

(F6) In some embodiments of any of F1-F5, the circuit board, ground plane, parasitic element, and antenna element are assembled in a stack.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 8C-1 to 8C-3 show various example parasitic elements in accordance with some embodiments.

Figure 1A:
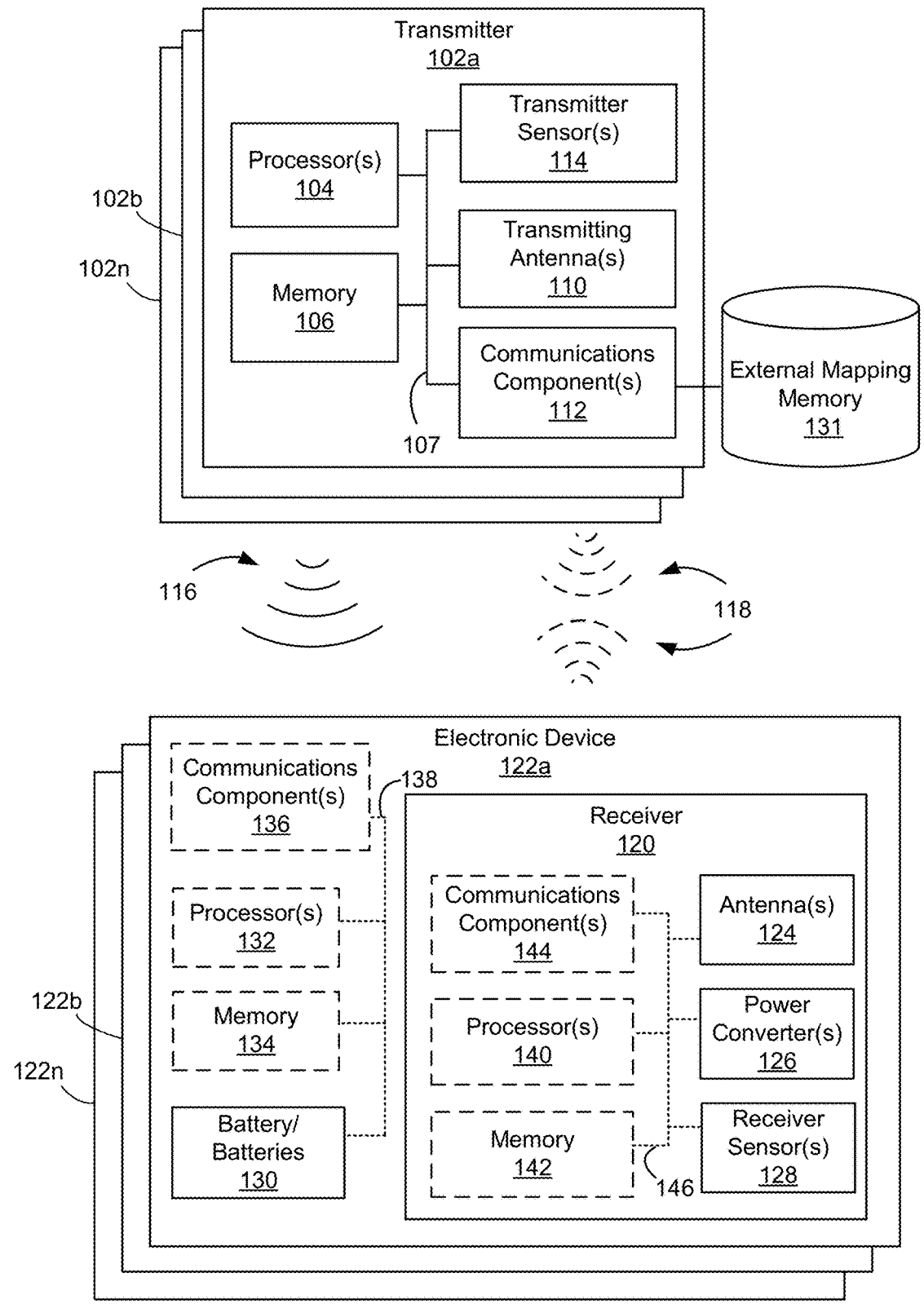
FIG. 1A is a block diagram illustrating a representative wireless power transmission system in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

FIG. 1A is a block diagram of components of wireless power transmission environment 100, in accordance with some embodiments. Wireless power transmission environment 100 includes, for example, transmitters 102 (e.g., transmitters 102a, 102b . . . 102n) and one or more receivers 120 (e.g., receivers 120a, 120b . . . 120n). In some embodiments, the wireless power transmission environment 100 includes a number of receivers 120, each of which is associated with a respective electronic device 122. In some instances, the transmitter 102 is referred to herein as a "wireless-power-transmitting device," a "wireless power transmitter," and a "transmitting device." Additionally, in some instances, the receiver 120 is referred to herein as a "wireless-power-receiving device," a "wireless power receiver," and a "receiving device."

An example transmitter 102 (e.g., transmitter 102a) includes, for example, one or more processor(s) 104, a memory 106, one or more transmitting antennas 110, one or more communications components 112 (also referred to herein as a communications radio), and/or one or more transmitter sensors 114. In some embodiments, these components are interconnected by way of a communications bus 107. References to these components of transmitters 102 cover embodiments in which one or more of these components (and combinations thereof) are included.

In some embodiments, the memory 106 stores one or more programs (e.g., sets of instructions) and/or data structures. In some embodiments, the memory 106, or the non-transitory computer readable storage medium of the memory 106 stores the following programs, modules, and data structures, or a subset or superset thereof:
  information received from receiver 120 (e.g., generated by receiver sensor 128 or processor 140, and then transmitted to the transmitter 102a);
  information received from transmitter sensor 114;
  an adaptive pocket-forming module that adjusts one or more power waves transmitted by one or more transmitters 102; and/or
  a beacon transmitting module that transmits a communication signal 118 for detecting a receiver 120 (e.g., within a transmission field of the transmitter 102).

The above-identified modules (e.g., data structures and/or programs including sets of instructions) need not be implemented as separate software programs, procedures, or modules, and thus various subsets of these modules may be combined or otherwise re-arranged in various embodiments. In some embodiments, the memory 106 stores a subset of the modules identified above. In some embodiments, an external mapping memory 131 that is communicatively connected to communications component 112 stores one or more modules identified above. Furthermore, the memory 106 and/or external mapping memory 131 may store additional modules not described above. In some embodiments, the modules stored in the memory 106, or a non-transitory computer readable storage medium of memory 106, provide instructions for implementing respective operations. In some embodiments, some or all of these modules may be implemented with specialized hardware circuits that subsume part or all of the module functionality. One or more of the above-identified elements may be executed by one or more of processor(s) 104. In some embodiments, one or more of the modules described with regard to the memory 106 is implemented on the memory of a server (not shown) that is communicatively coupled to one or more transmitters 102 and/or by a memory of electronic device 122 and/or receiver 120.

In some embodiments, a single processor 104 (e.g., processor 104 of transmitter 102a) executes software modules for controlling multiple transmitters 102 (e.g., transmitters 102b . . . 102n). In some embodiments, a single transmitter 102 (e.g., transmitter 102a) includes multiple processors 104, such as one or more transmitter processors (configured to, e.g., control transmission of RF signals 116 by transmitting antenna(s) 110), one or more communications component processors (configured to, e.g., control communications transmitted by communications component 112 and/or receive communications by way of communications component 112) and/or one or more sensor processors (configured to, e.g., control operation of transmitter sensor 114 and/or receive output from transmitter sensor 114).

The wireless power receiver 120 receives power transmission signals 116 and/or communications 118 transmitted by transmitters 102. In some embodiments, the receiver 120 includes one or more antennas 124, power converters 126, receiver sensors 128, and/or other components or circuitry (e.g., processor(s) 140, memory 142, and/or communication component(s) 144). In some embodiments, these components are interconnected by way of a communications bus 146. References to these components of the receiver 120 cover embodiments in which one or more of these components (and combinations thereof) are included. The antennas 124 are discussed in further detail below, and may be referred to herein as receiving antennas 124. Note that while the discussion below concerns a single receiving antenna 124, it should be understood that the receiver 120 may include multiple instances of the receiving antenna 124 in an antenna array.

The receiver 120 converts energy from received signals 116 (also referred to herein as RF power transmission signals, or simply, RF signals, RF waves, electromagnetic (EM) power waves, power waves, or power transmission signals) into electrical energy to power and/or charge electronic device 122. For example, the receiver 120 uses the power converter 126 to convert energy derived from power waves 116 to alternating current (AC) electricity or direct current (DC) electricity usable to power and/or charge the electronic device 122. Non-limiting examples of the power converter 126 include rectifiers, rectifying circuits, voltage conditioners, among suitable circuitry and devices. The power converter 126 is also referred to herein as "conversion circuitry" and a "receiver integrated circuit."

In some embodiments, the receiver 120 is a standalone device that is detachably coupled to one or more electronic devices 122. For example, the electronic device 122 has processor(s) 132 for controlling one or more functions of the electronic device 122, and the receiver 120 has processor(s) 140 for controlling one or more functions of the receiver 120. In some other embodiments, the receiver 120 is a component of the electronic device 122. For example, processors 132 control functions of the electronic device 122 and the receiver 120. In addition, in some embodiments, the receiver 120 includes one or more processors 140, which communicates with processors 132 of the electronic device 122.

In some embodiments, the electronic device 122 includes one or more processors 132, memory 134, one or more communication components 136, and/or one or more batteries 130. In some embodiments, these components are interconnected by way of a communications bus 138. In some embodiments, communications between the electronic device 122 and receiver 120 occur via communications component(s) 136 and/or 144. In some other embodiments, communications between the electronic device 122 and receiver 120 occur via a wired connection between communications bus 138 and communications bus 146. In some embodiments, the electronic device 122 and the receiver 120 share a single communications bus.

Figure 5:
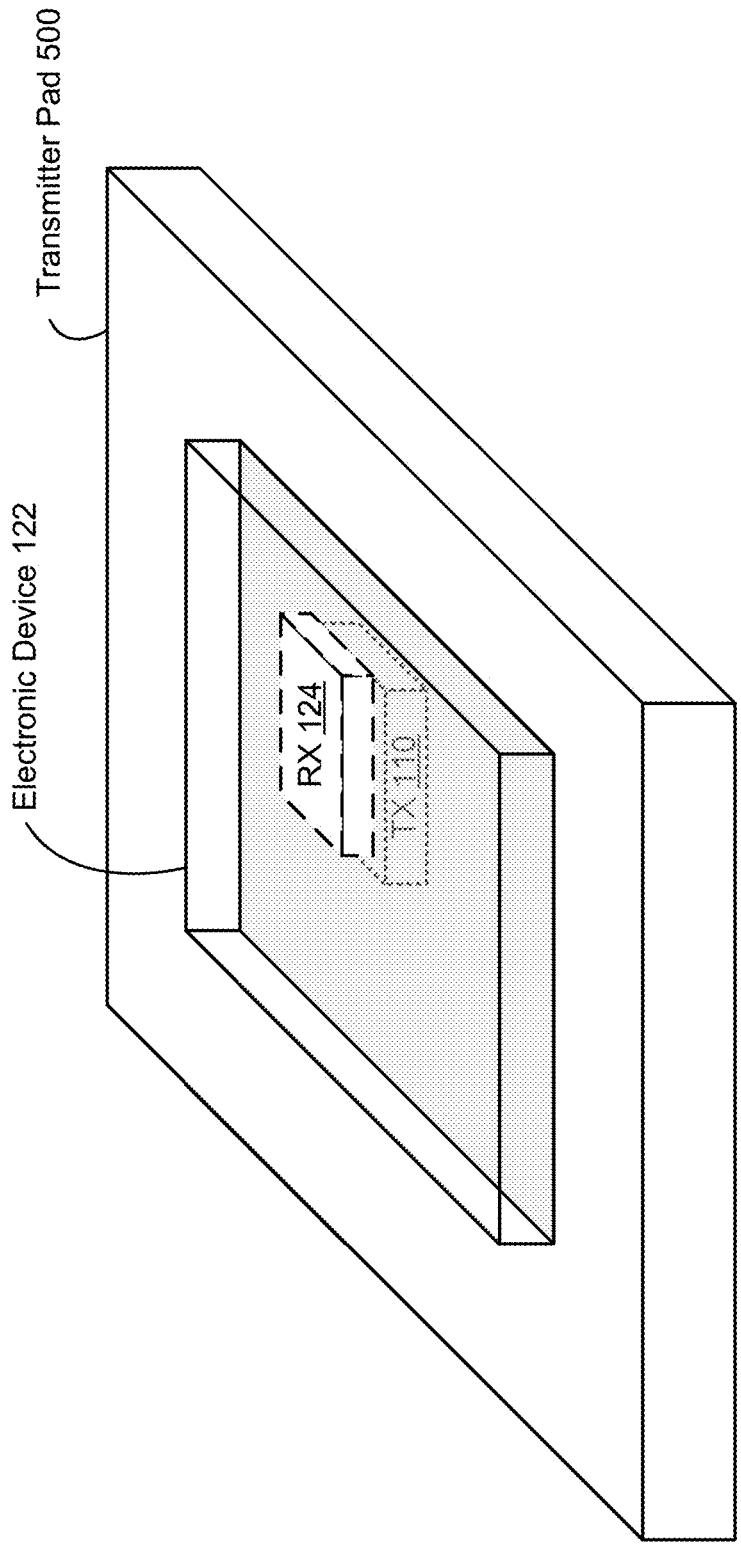
FIG. 5 shows one example of an electronic device, with a receiving antenna integrated therein, positioned on a transmitted pad, having a transmitting antenna integrated therein.
Figure 6:
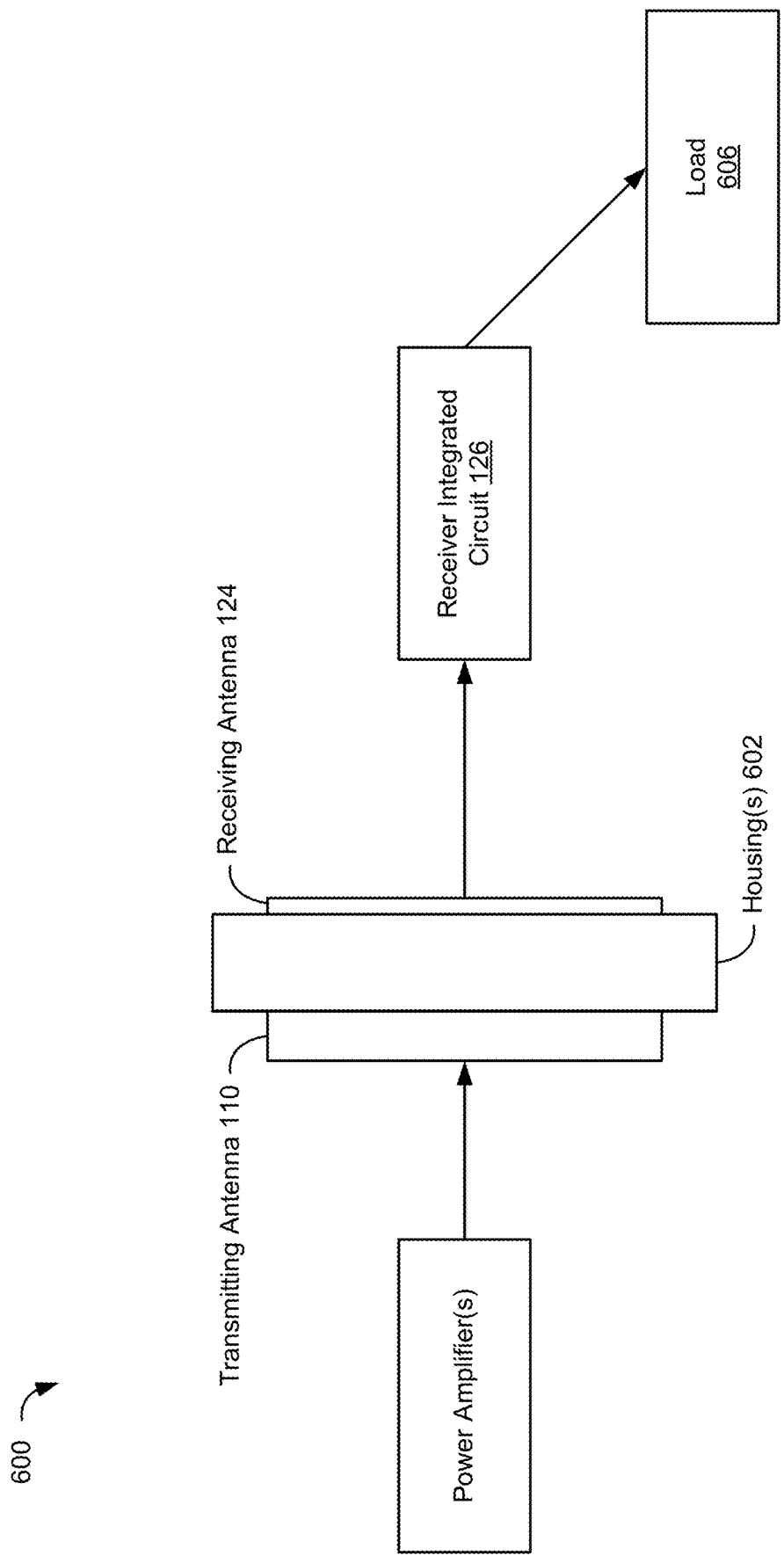
FIG. 6 is a block diagram illustrating an interaction between a transmitting antenna and a receiving antenna in accordance with some embodiments.

The receiver 120 is configured to receive one or more power waves 116 directly from the transmitter 102 (e.g., via one or more antennas 124). Furthermore, the receiver 120 is configured to harvest power waves from energy created by one or more power waves 116 transmitted by the transmitter 102. In some embodiments, the transmitter 102 is a near-field transmitter that transmits the one or more power waves 116 within a near-field distance (e.g., less than approximately six inches away from the transmitter 102, as shown in FIGS. 5 and 6). In some other embodiments, the transmitter 102 is a far-field transmitter that transmits the one or more power waves 116 within a far-field distance (e.g., more than approximately six inches away from the transmitter 102).

In some embodiments, after the power waves 116 are received and/or energy is harvested from the waves, circuitry 126 (e.g., integrated circuits, amplifiers, rectifiers, and/or voltage conditioner) of the receiver 120 converts the energy of the power waves to usable power (i.e., electricity), which powers the electronic device 122 and/or is stored to the battery 130 of the electronic device 122. In some embodiments, a rectifying circuit of the receiver 120 translates the electrical energy from AC to DC for use by the electronic device 122. In some embodiments, a voltage conditioning circuit increases or decreases the voltage of the electrical energy as required by the electronic device 122. In some embodiments, an electrical relay conveys electrical energy from the receiver 120 to the electronic device 122.

In some embodiments, the electronic device 122 obtains power from multiple transmitters 102 and/or using multiple receivers 120. In some embodiments, the wireless power transmission environment 100 includes a plurality of electronic devices 122, each having at least one respective receiver 120 that is used to harvest power waves from the transmitters 102 into usable power for charging the electronic devices 122.

In some embodiments, the one or more transmitters 102 adjust values of one or more characteristics (e.g., waveform characteristics, such as phase, gain, direction, amplitude, polarization, and/or frequency) of power waves 116. For example, a transmitter 102 selects one or more transmitting antennas 110 to initiate transmission of power waves 116, cease transmission of power waves 116, and/or adjust values of one or more characteristics used to transmit power waves 116. In some embodiments, the one or more transmitters 102 adjust power waves 116 such that trajectories of power waves 116 converge at a predetermined location within a transmission field (e.g., a location or region in space), resulting in controlled constructive or destructive interference patterns. The transmitter 102 may adjust values of one or more characteristics for transmitting the power waves 116 to account for changes at the wireless power receiver 120 that may negatively impact transmission of the power waves 116. The transmitting antennas 110 are discussed in further detail below with respect to FIGS. 2A and 2B.

In some embodiments, the transmitting antennas 110 may include a set of one or more antennas configured to transmit the power waves 116 into respective transmission fields of the one or more transmitters 102. Integrated circuits (not shown) of the respective transmitter 102, such as a controller circuit (e.g., a radio frequency integrated circuit (RFIC)) and/or waveform generator, may control the behavior of the antennas 110. For example, based on the information received from the receiver 120 by way of the communication signal 118, a controller circuit (e.g., processor 104 of the transmitter 102, FIG. 1A) may determine values of the waveform characteristics (e.g., amplitude, frequency, trajectory, direction, phase, polarization, among other characteristics) of power waves 116 that would effectively provide power to the receiver 120, and in turn, the electronic device 122. The controller circuit may also identify which transmitting antennas 110 would be effective in transmitting the power waves 116. In some embodiments, a waveform generator circuit (not shown in FIG. 1A) of the respective transmitter 102 coupled to the processor 104 may convert energy and generate the power waves 116 having the specific values for the waveform characteristics identified by the processor 104/controller circuit, and then provide the power waves to the transmitting antennas 110 110 for transmission.

In some embodiments, constructive interference of power waves occurs when two or more power waves 116 (e.g., RF power transmission signals) are in phase with each other and converge into a combined wave such that an amplitude of the combined wave is greater than amplitude of a single one of the power waves. For example, the positive and negative peaks of sinusoidal waveforms arriving at a location from multiple antennas "add together" to create larger positive and negative peaks. In some embodiments, a pocket of energy is formed at a location in a transmission field where constructive interference of power waves occurs.

In contrast, destructive interference of power waves occurs when two or more power waves are out of phase and converge into a combined wave such that the amplitude of the combined wave is less than the amplitude of a single one of the power waves. For example, the power waves "cancel each other out," thereby diminishing the amount of energy concentrated at a location in the transmission field. In some embodiments, destructive interference is used to generate a negligible amount of energy or "null" at a location within the transmission field where the power waves converge. Note that, in some embodiments, the transmitter 102 utilizes beamforming techniques to wirelessly transfer power to a receiver 120, while in other embodiments, the transmitter 102 does not utilize beamforming techniques to wirelessly transfer power to a receiver 120 (e.g., in circumstances in which no beamforming techniques are used, the transmitter controller IC 160 discussed below might be designed without any circuitry to allow for use of beamforming techniques, or that circuitry may be present, but might be deactivated to eliminate any beamforming control capability).

In some embodiments, the communications component 112 transmits communication signals 118 by way of a wired and/or wireless communication connection to the receiver 120. In some embodiments, the communications component 112 generates communication signals 118 used for triangulation of the receiver 120. In some embodiments, the communication signals 118 are used to convey information between the transmitter 102 and receiver 120 for adjusting values of one or more waveform characteristics used to transmit the power waves 116. In some embodiments, the communication signals 118 include information related to status, efficiency, user data, power consumption, billing, geo-location, and other types of information.

In some embodiments, the communications component 112 includes a communications component antenna for communicating with the receiver 120 and/or other transmitters 102 (e.g., transmitters 102b through 102n). In some embodiments, these communication signals 118 are sent using a first channel (e.g., a first frequency band) that is independent and distinct from a second channel (e.g., a second frequency band distinct from the first frequency band) used for transmission of the power waves 116.

In some embodiments, the receiver 120 includes a receiver-side communications component 144 configured to communicate various types of data with one or more of the transmitters 102, through a respective communication signal 118 generated by the receiver-side communications component (in some embodiments, a respective communication signal 118 is referred to as an advertising signal). The data may include location indicators for the receiver 120 and/or electronic device 122, a power status of the device 122, status information for the receiver 120, status information for the electronic device 122, status information about the power waves 116, and/or status information for pockets of energy. In other words, the receiver 120 may provide data to the transmitter 102, by way of the communication signal 118, regarding the current operation of the system 100, including: information identifying a present location of the receiver 120 or the device 122, an amount of energy (i.e., usable power) received by the receiver 120, and an amount of usable power received and/or used by the electronic device 122, among other possible data points containing other types of information.

In some embodiments, the data contained within communication signals 118 is used by the electronic device 122, the receiver 120, and/or the transmitters 102 for determining adjustments to values of one or more waveform characteristics used by the transmitting antennas 110 to transmit the power waves 116. Using a communication signal 118, the transmitter 102 communicates data that is used, e.g., to identify receivers 120 within a transmission field, identify electronic devices 122, determine safe and effective waveform characteristics for power waves, and/or hone the placement of pockets of energy. In some embodiments, the receiver 120 uses a communication signal 118 to communicate data for alerting transmitters 102 that the receiver 120 has entered or is about to enter a transmission field, provide information about the electronic device 122, provide user information that corresponds to the electronic device 122, indicate the effectiveness of received power waves 116, and/or provide updated characteristics or transmission parameters that the one or more transmitters 102 use to adjust transmission of the power waves 116.

In some embodiments, transmitter sensor 114 and/or receiver sensor 128 detect and/or identify conditions of the electronic device 122, the receiver 120, the transmitter 102, and/or a transmission field. In some embodiments, data generated by the transmitter sensor 114 and/or receiver sensor 128 is used by the transmitter 102 to determine appropriate adjustments to values of waveform characteristics used to transmit the power waves 116. Data from transmitter sensor 114 and/or receiver sensor 128 received by the transmitter 102 includes, e.g., raw sensor data and/or sensor data processed by a processor 104, such as a sensor processor. Processed sensor data includes, e.g., determinations based upon sensor data output. In some embodiments, sensor data received from sensors that are external to the receiver 120 and the transmitters 102 is also used (such as thermal imaging data, information from optical sensors, and others).

In some embodiments, the receiver sensor 128 is a gyroscope that provides raw data such as orientation data (e.g., tri-axial orientation data), and processing this raw data may include determining a location of the receiver 120 and/or or a location of receiver antenna 124 using the orientation data. Furthermore, the receiver sensor 128 can indicate an orientation of the receiver 120 and/or electronic device 122. As one example, the transmitters 102 receive orientation information from the receiver sensor 128 and the transmitters 102 (or a component thereof, such as the processor 104) use the received orientation information to determine whether electronic device 122 is flat on a table, in motion, and/or in use (e.g., next to a user's head).

Non-limiting examples of the transmitter sensor 114 and/or the receiver sensor 128 include, e.g., infrared, pyroelectric, ultrasonic, laser, optical, Doppler, gyro, accelerometer, microwave, millimeter, RF standing-wave sensors, resonant LC sensors, capacitive sensors, and/or inductive sensors. In some embodiments, technologies for the transmitter sensor 114 and/or the receiver sensor 128 include binary sensors that acquire stereoscopic sensor data, such as the location of a human or other sensitive object.

In some embodiments, the transmitter sensor 114 and/or receiver sensor 128 is configured for human recognition (e.g., capable of distinguishing between a person and other objects, such as furniture). Examples of sensor data output by human recognition-enabled sensors include: body temperature data, infrared range-finder data, motion data, activity recognition data, silhouette detection and recognition data, gesture data, heart rate data, portable devices data, and wearable device data (e.g., biometric readings and output, accelerometer data).

Figure 1B:
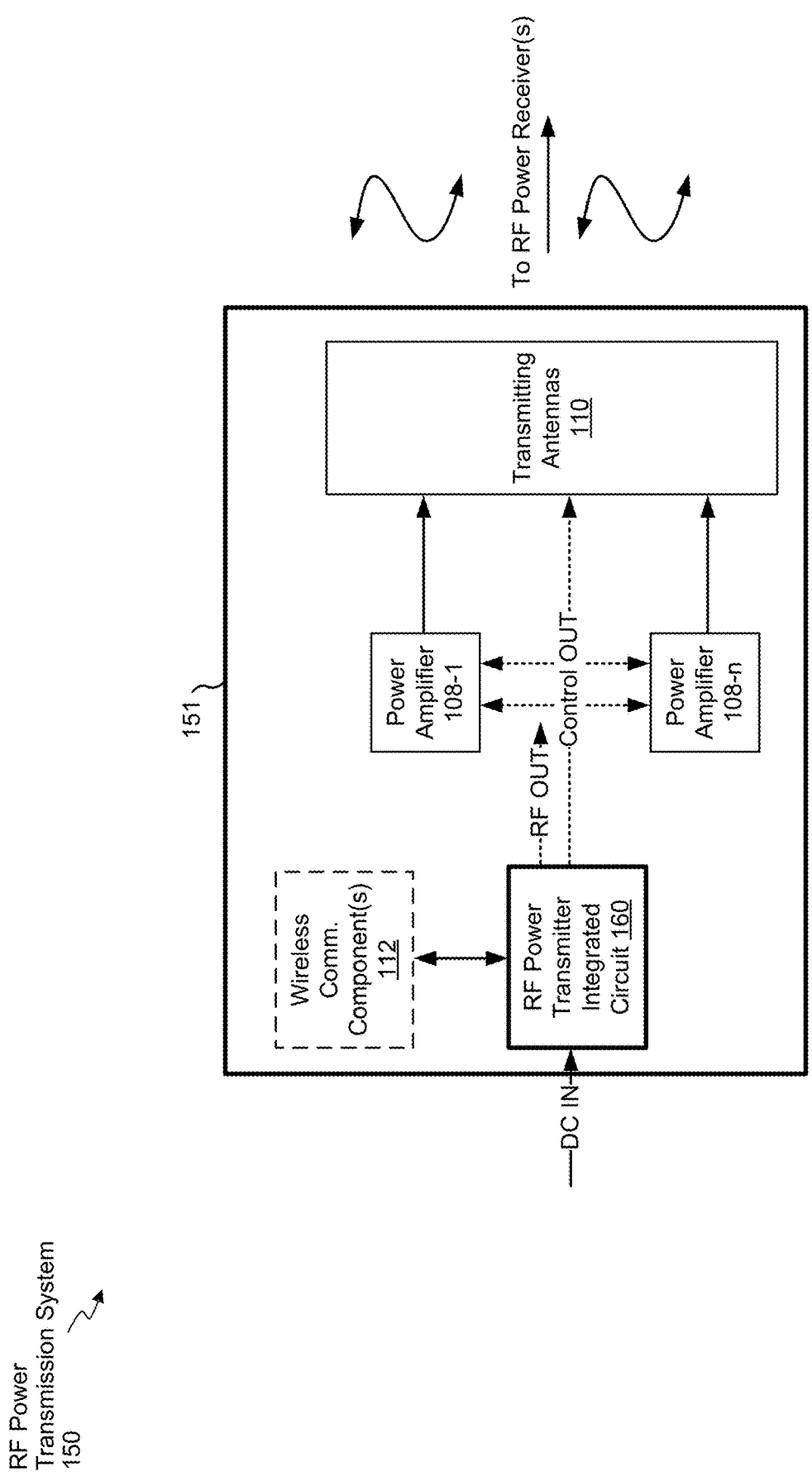
FIG. 1B is another block diagram of an RF wireless power transmission system, in accordance with some embodiments.

FIG. 1B is another block diagram of an RF wireless power transmission system 150 in accordance with some embodiments. In some embodiments, the RF wireless power transmission system 150 includes a far-field transmitter (not shown). In some embodiments, the RF wireless power transmission system 150 includes a RF charging pad 151 (also referred to herein as a near-field (NF) charging pad 151 or RF charging pad 151). The RF charging pad 151 may be an example of the transmitter 102 in FIG. 1A.

In some embodiments, the RF charging pad 151 includes an RF power transmitter integrated circuit 160 (described in more detail below). In some embodiments, the RF charging pad 151 includes one or more communications components 112 (e.g., wireless communication components, such as WI-FI or BLUETOOTH radios). In some embodiments, the RF charging pad 151 also connects to one or more power amplifier units 108-1, . . . 108-n (PA or PA units) to control operation of the one or more power amplifier units when they drive external power-transfer elements (e.g., antennas 110). In some embodiments, RF power is controlled and modulated at the RF charging pad 151 via switch circuitry as to enable the RF wireless power transmission system to send RF power to one or more wireless receiving devices via the TX antenna array 110.

Figure 1C:
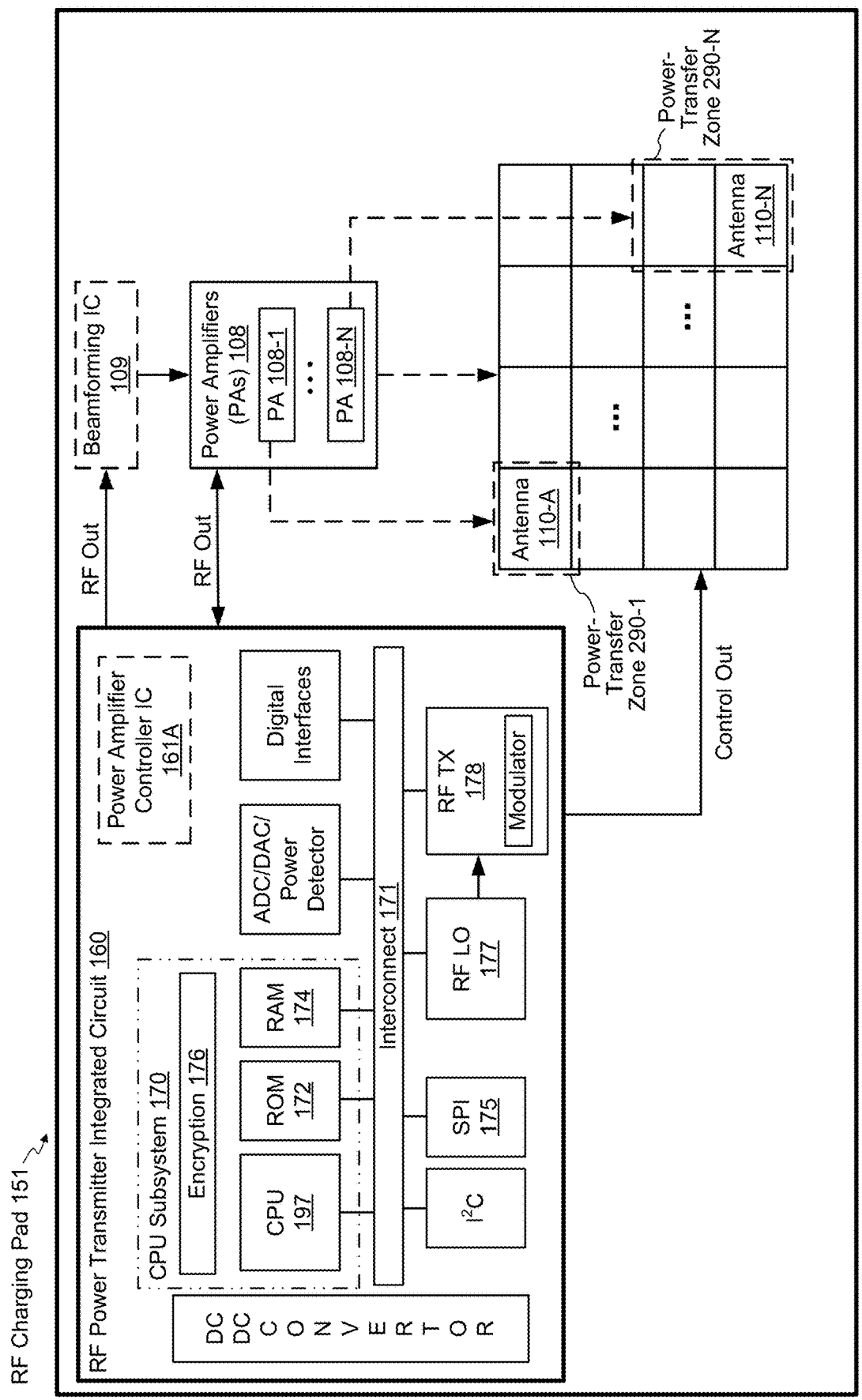
FIG. 1C is a block diagram showing components of an example RF charging pad that includes an RF power transmitter integrated circuit and antenna zones, in accordance with some embodiments.

FIG. 1C is a block diagram of the RF power transmitter integrated circuit 160 (the "integrated circuit") in accordance with some embodiments. In some embodiments, the integrated circuit 160 includes a CPU subsystem 170, an external device control interface, an RF subsection for DC to RF power conversion, and analog and digital control interfaces interconnected via an interconnection component, such as a bus or interconnection fabric block 171. In some embodiments, the CPU subsystem 170 includes a microprocessor unit (CPU) 197 with related Read-Only-Memory (ROM) 172 for device program booting via a digital control interface, e.g. an I2C port, to an external FLASH containing the CPU executable code to be loaded into the CPU Subsystem Random Access Memory (RAM) 174 or executed directly from FLASH. In some embodiments, the CPU subsystem 170 also includes an encryption module or block 176 to authenticate and secure communication exchanges with external devices, such as wireless power receivers that attempt to receive wirelessly delivered power from the RF charging pad 150.

In some embodiments, the RF IC 160 also includes (or is in communication with) a power amplifier controller IC 161A (PA IC) that is responsible for controlling and managing operations of a power amplifier (or multiple power amplifiers), including for reading measurements of impedance at various measurement points within the power amplifier 108, whereby these measurements are used, in some instances, for detecting of foreign objects. The PA IC 161A may be on the same integrated circuit at the RF IC 160, or may be on its on integrated circuit that is separate from (but still in communication with) the RF IC 160.

In some embodiments, executable instructions running on the CPU (such as those shown in the memory 106 in FIG. 2 and described below) are used to manage operation of the RF charging pad 151 and to control external devices through a control interface, e.g., SPI control interface 175, and the other analog and digital interfaces included in the RF power transmitter integrated circuit 160. In some embodiments, the CPU subsystem also manages operation of the RF subsection of the RF power transmitter integrated circuit 160, which includes an RF local oscillator (LO) 177 and an RF transmitter (TX) 178. In some embodiments, the RF LO 177 is adjusted based on instructions from the CPU subsystem 170 and is thereby set to different desired frequencies of operation, while the RF TX converts, amplifies, modulates the RF output as desired to generate a viable RF power level.

In the descriptions that follow, various references are made to antenna zones and power-transfer zones, which terms are used synonymously in this disclosure. In some embodiments the antenna/power-transfer zones may include antenna elements that transmit propagating radio frequency waves but, in other embodiments, the antenna/power-transfer zones may instead include capacitive charging couplers that convey electrical signals but do not send propagating radio frequency waves.

In some embodiments, the RF power transmitter integrated circuit 160 provides the viable RF power level (e.g., via the RF TX 178) to an optional beamforming integrated circuit (IC) 109, which then provides phase-shifted signals to one or more power amplifiers 108. In some embodiments, the beamforming IC 109 is used to ensure that power transmission signals sent using two or more antennas 110 (e.g., each antenna 110 may be associated with a different antenna zone 290 or may each belong to a single antenna zone 290) to a particular wireless power receiver are transmitted with appropriate characteristics (e.g., phases) to ensure that power transmitted to the particular wireless power receiver is maximized (e.g., the power transmission signals arrive in phase at the particular wireless power receiver). In some embodiments, the beamforming IC 109 forms part of the RF power transmitter IC 160. In embodiments in which capacitive couplers are used as the antennas 110, then optional beamforming IC 109 may not be included in the RF power transmitter integrated circuit 160.

In some embodiments, the RF power transmitter integrated circuit 160 provides the viable RF power level (e.g., via the RF TX 178) directly to the one or more power amplifiers 108 and does not use the beamforming IC 109 (or bypasses the beamforming IC if phase-shifting is not required, such as when only a single antenna 110 is used to transmit power transmission signals to a wireless power receiver). In some embodiments, the PA IC 161A receives the viable RF power level and provides that to the one or more power amplifiers 108.

In some embodiments, the one or more power amplifiers 108 then provide RF signals to the antenna zones 290 (also referred to herein as "power-transfer zones") for transmission to wireless power receivers that are authorized to receive wirelessly delivered power from the RF charging pad 151. In some embodiments, each antenna zone 290 is coupled with a respective PA 108 (e.g., antenna zone 290-1 is coupled with PA 108-1 and antenna zone 290-N is coupled with PA 108-N). In some embodiments, multiple antenna zones are each coupled with a same set of PAs 108 (e.g., all PAs 108 are coupled with each antenna zone 290). Various arrangements and couplings of PAs 108 to antenna zones 290 allow the RF charging pad 151 to sequentially or selectively activate different antenna zones in order to determine the most efficient antenna zone 290 to use for transmitting wireless power to a wireless power receiver. In some embodiments, the one or more power amplifiers 108 are also in communication with the CPU subsystem 170 to allow the CPU 197 to measure output power provided by the PAs 108 to the antenna zones 110 of the RF charging pad 151.

FIG. 1C also shows that, in some embodiments, the antenna zones 290 of the RF charging pad 151 may include one or more antennas 110A-N. In some embodiments, each antenna zone of the plurality of antenna zones 290 includes one or more antennas 110 (e.g., antenna zone 290-1 includes one antenna 110-A and antenna zones 290-N includes multiple antennas 110). In some embodiments, a number of antennas included in each of the antenna zones is dynamically defined based on various parameters, such as a location of a wireless power receiver on the RF charging pad 151. In some embodiments, each antenna zone 290 may include antennas of different types, while in other embodiments each antenna zone 290 may include a single antenna of a same type, while in still other embodiments, the antennas zones may include some antenna zones that include a single antenna of a same type and some antenna zones that include antennas of different types. In some embodiments the antenna/power-transfer zones may also or alternatively include capacitive charging couplers that convey electrical signals but do not send propagating radio frequency waves.

In some embodiments, the RF charging pad 151 may also include a temperature monitoring circuit that is in communication with the CPU subsystem 170 to ensure that the RF charging pad 151 remains within an acceptable temperature range. For example, if a determination is made that the RF charging pad 151 has reached a threshold temperature, then operation of the RF charging pad 151 may be temporarily suspended until the RF charging pad 151 falls below the threshold temperature.

By including the components shown for RF power transmitter circuit 160 (FIG. 1C) on a single chip, such transmitter chips are able to manage operations at the transmitter chips more efficiently and quickly (and with lower latency), thereby helping to improve user satisfaction with the charging pads that are managed by these transmitter chips. For example, the RF power transmitter circuit 160 is cheaper to construct, has a smaller physical footprint, and is simpler to install.

Figure 1D:
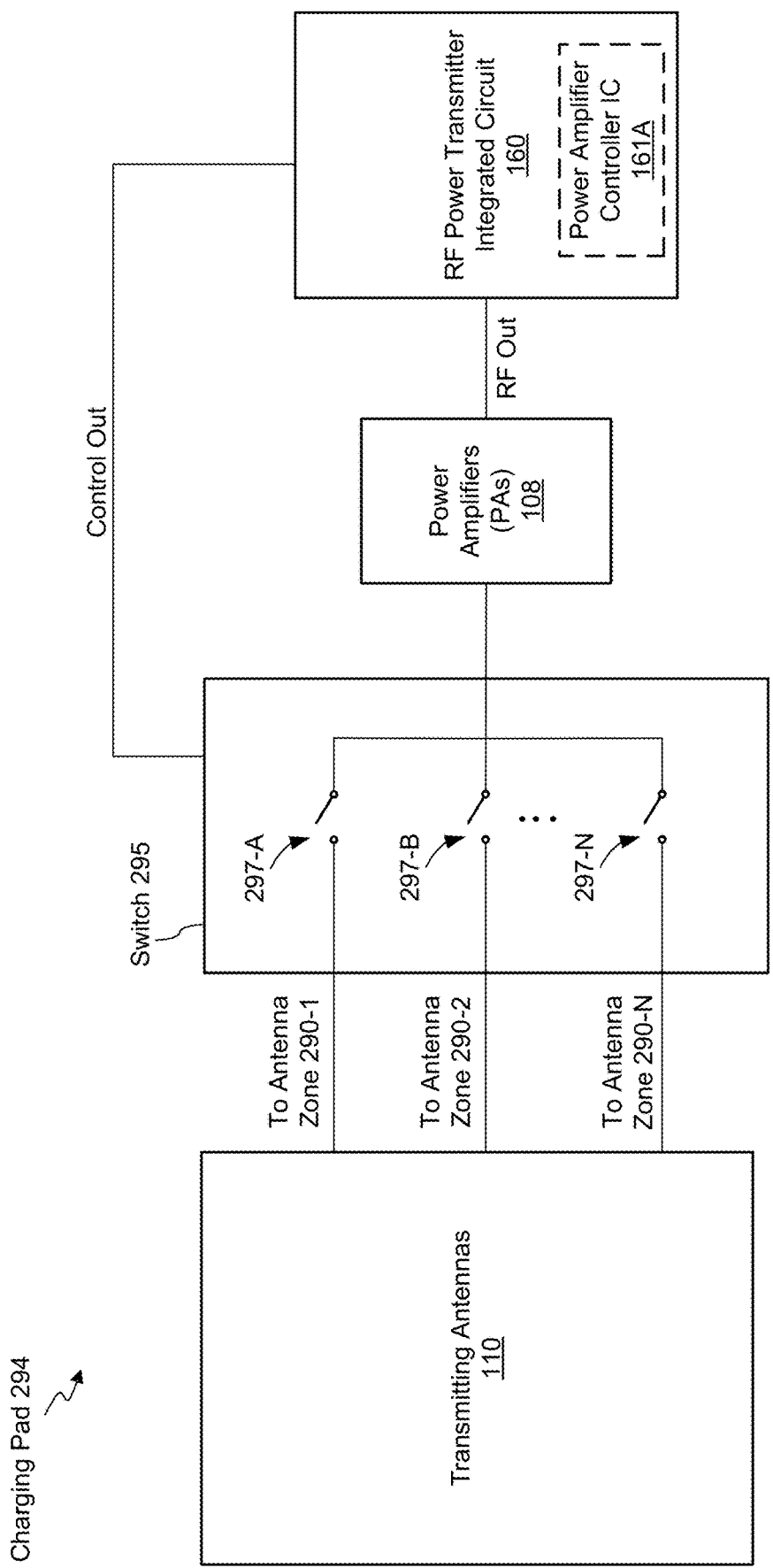
FIG. 1D is a block diagram showing components of an example RF charging pad that includes an RF power transmitter integrated circuit coupled to a switch, in accordance with some embodiments.

FIG. 1D is a block diagram of a charging pad 294 in accordance with some embodiments. The charging pad 294 is an example of the charging pad 151 (FIG. 1B), however, one or more components included in the charging pad 151 are not included in the charging pad 294 for ease of discussion and illustration.

The charging pad 294 includes an RF power transmitter integrated circuit 160, one or more power amplifiers 108, a PA IC 161A (which may be on the same or a separate IC from the RF power transmitter IC 160), and multiple transmitting antennas 110 that are divided into multiple antenna zones. Each of these components is described in detail above with reference to FIGS. 1A-1C. Additionally, the charging pad 294 includes a switch 295 (i.e., transmitter-side switch), positioned between the power amplifiers 108 and the transmitting antennas 110, having a plurality of switches 297-A, 297-B, . . . 297-N. The switch 295 is configured to switchably connect one or more power amplifiers 108 with one or more antenna zones 290 in response to control signals provided by the RF power transmitter integrated circuit 160.

To accomplish the above, each switch 297 is coupled with (e.g., provides a signal pathway to) a different antenna zone of the array 110. For example, switch 297-A may be coupled with a first antenna zone 290-1 (FIG. 1C) of the array 110, switch 297-B may be coupled with a second antenna zone 290-2 of the array 110, and so on. Each of the plurality of switches 297-A, 297-B, . . . 297-N, once closed, creates a unique pathway between a respective power amplifier 108 (or multiple power amplifiers 108) and a respective antenna zone of the array 110. Each unique pathway through the switch 295 is used to selectively provide RF signals to specific antenna zones. It is noted that two or more of the plurality of switches 297-A, 297-B, . . . 297-N may be closed at the same time, thereby creating multiple unique pathways to the multiple transmitting antennas 110 that may be used simultaneously.

In some embodiments, the RF power transmitter integrated circuit 160 (or the PA IC 161A, or both) is (are) coupled to the switch 295 and is configured to control operation of the plurality of switches 297-A, 297-B, . . . 297-N (illustrated as a "control out" signal in FIGS. 1B and 1D). For example, the RF power transmitter integrated circuit 160 may close a first switch 297-A while keeping the other switches open. In another example, the RF power transmitter integrated circuit 160 may close a first switch 297-A and a second switch 297-B, and keep the other switches open (various other combinations and configuration are possible). Moreover, the RF power transmitter integrated circuit 160 is coupled to the one or more power amplifiers 108 and is configured to generate a suitable RF signal (e.g., the "RF Out" signal) and provide the RF signal to the one or more power amplifiers 108. The one or more power amplifiers 108, in turn, are configured to provide the RF signal to one or more antenna zones of the array 110 via the switch 295, depending on which switches 297 in the switch 295 are closed by the RF power transmitter integrated circuit 160.

In some embodiments, the charging pad is configured to transmit test power transmission signals and/or regular power transmission signals using different antenna zones, e.g., depending on a location of a receiver on the charging pad. Accordingly, when a particular antenna zone is selected for transmitting test signals or regular power signals, a control signal is sent to the switch 295 from the RF power transmitter integrated circuit 160 to cause at least one switch 297 to close. In doing so, an RF signal from at least one power amplifier 108 can be provided to the particular antenna zone using a unique pathway created by the now-closed at least one switch 297.

In some embodiments, the switch 295 may be part of (e.g., internal to) the multiple transmitting antennas 110. Alternatively, in some embodiments, the switch 295 is separate from the multiple transmitting antennas 110 (e.g., the switch 295 may be a distinct component, or may be part of another component, such as the power amplifier(s) 108). It is noted that any switch design capable of accomplishing the above may be used, and the design of the switch 295 illustrated in FIG. 1D is merely one example.

Figure 2A:
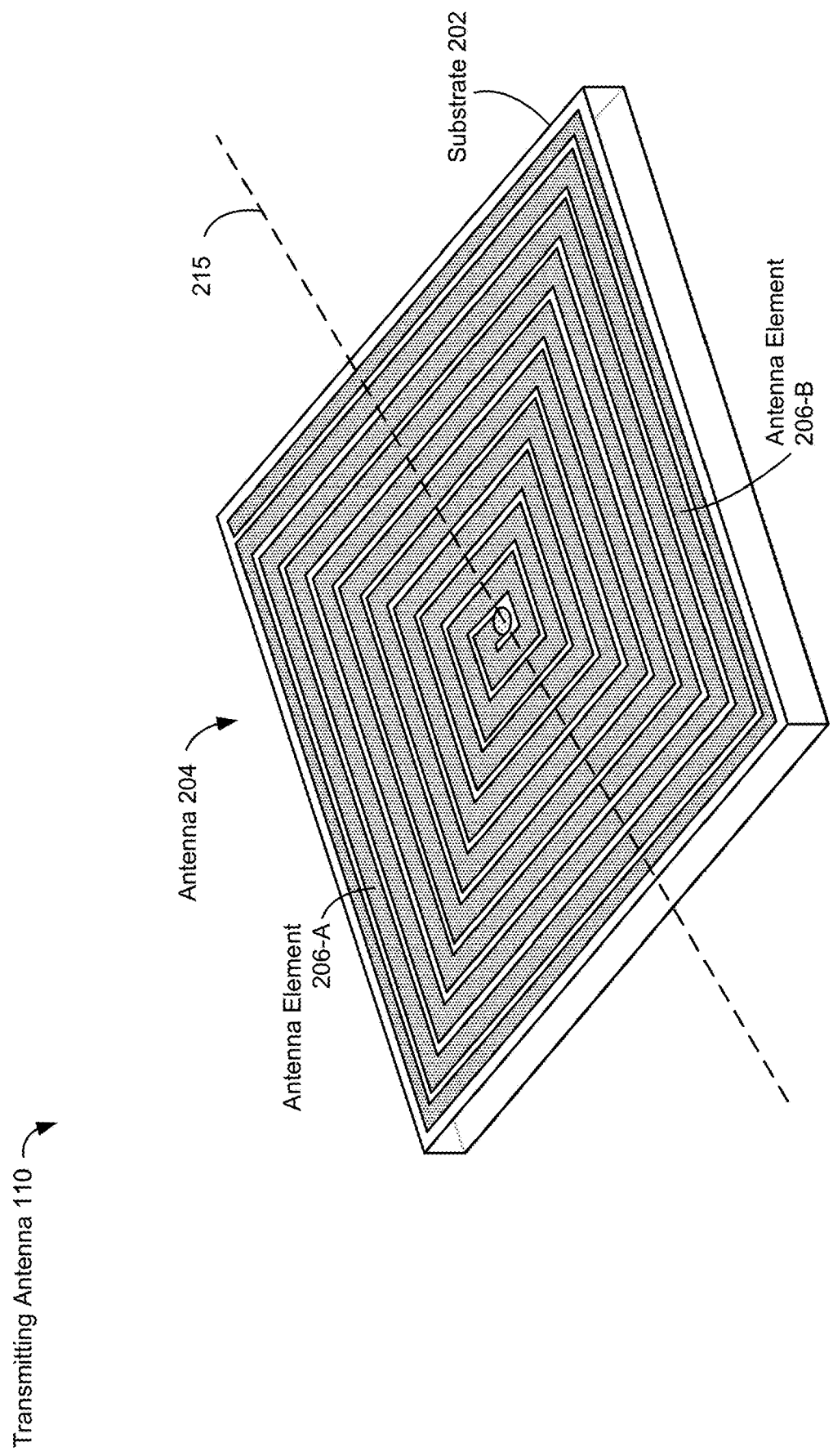
FIGS. 2A and 2B shows various views of an example transmitting antenna in accordance with some embodiments.

The remaining figures below cover various implementations of the wireless power transmission environment 100 discussed above. For example, FIGS. 2A through 3B shows various views of an example near-field power transfer system (i.e., one implementation of the wireless power transmission environment 100). Specifically, FIG. 2A shows a top perspective view of a transmitting antenna 110 used in the example near-field power transfer system. In some embodiments, the transmitting antenna 110 is housed by a housing constructed of a material creating minimal obstructions for electromagnetic waves to pass through. In other embodiments, different portions of the housing may be constructed with materials having different electromagnetic properties such as permeability and permittivity. As one example, a top surface of the housing may allow electromagnetic waves to pass through with minimal obstruction while the sidewalls of the housing may obstruct electromagnetic waves by attenuation, absorption, reflection, or other techniques known in the art.

The transmitting antenna 110 is configured to radiate RF energy (e.g., electromagnetic waves/signals), and thus transfer power when adjacent to a receiving antenna 124 (discussed below with reference to FIGS. 3A to 3C). As such, the transmitting antenna 110 may be on a "transmit side," so as to function as a power transmitter, and the receiving antenna 124 may be on a "receive side," so as to function as a power receiver. In some embodiments, the transmitting antenna 110 (or subcomponents of the transmitting antenna 110) may be integrated into a transmitter device 102, or may be externally wired to the transmitter device 102. As will be discussed in more detail below with reference to FIG. 7A and FIG. 7B, the example near-field power transfer system can achieve an energy transfer efficiency of 90% or higher, despite being configured to operate at low frequencies, such as 40 MHz.

A substrate 202 may be disposed within a space defined between the top surface, sidewalls, and the bottom surface of the housing. In some embodiments, the transmitting antenna 110 may not include the housing and instead the substrate 202 may include the top surface, sidewalls, and the bottom surface. The substrate 202 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may generate radiation, and may act as reflectors.

The transmitting antenna 110 includes an antenna 204 (also referred to herein as a "radiator element," or a "radiator"). The antenna 204 may be constructed on or below the top surface of the housing (or the substrate 202). The antenna 204 may be used for transmitting electromagnetic waves (e.g., waves 116). The antenna 204 may be constructed from materials such as metals, alloys, metamaterials and composites. For example, the antenna 204 may be made of copper or copper alloys. The antenna 204 may be constructed to have different shapes based on power transfer requirements. For example, in FIGS. 2A and 2B, the antenna 204 is constructed in a shape of a spiral including antenna elements 206 (also referred to herein as "antenna segments") that are disposed close to each other. In the illustrated embodiment, the antenna 204 includes ten full turns (i.e., ten complete revolutions). It is noted that various turn amounts can be used, so long as the number of turns is greater than the number of turns made by an antenna 304 of the receiving antenna 124. As will be discussed in further detail below, a higher coupling efficiency is achieved by designing the antenna 204 to have more turns than the antenna 304 of the receiving antenna 124 (along with other changes to the design of the antennas 204 and 304, such as width of antenna segments, antenna thickness, location of feeds, and material selection). The spiral shape of the antenna elements 206 is planar, meaning that each revolution of the antenna 204 is on the same plane. Furthermore, while the spiral shape of the antenna elements 206 is rectangular in FIGS. 2A and 2B, the spiral shape may be various other shapes. It is noted that, in some embodiments, the antenna elements 206 (and antenna elements 306) are formed by grounded lines and are much smaller than a wavelength of the transmitted electromagnetic waves.

In some embodiments, a width of antenna elements 206 varies from one turn to the next. Put another way, a surface area of a respective antenna element 206 of the antenna 204 differs from a surface area of at least one other antenna element 206 of the antenna 204. For example, with reference to FIG. 2B, the outer most antenna element 206 of the antenna 204 has a width of $D^1$, while the other antenna elements of the antenna 204 each has a width of $D^2$, which is greater than the width of D' (i.e., the outer most revolution of the antenna 204 in thinner than other revolutions of the antenna 204). In some embodiments, each revolution of the antenna 204 may have a different width (e.g., a width of the antenna 204 may progressively increase (or decrease) with each revolution of the antenna 204). Varying the widths of the antenna elements 206 can be used to adjust a surface area of the antenna 206, and in turn, adjust an operating frequency of the antenna 206. In some embodiments, a surface area of each antenna element 206 is optimized according to a design of the antenna 304 of the receiving antenna 124. It is noted that, in some embodiments, the antenna 204 is continuous (e.g., a continuous spiral), while in other embodiments the antenna 204 is composed of contiguous antenna segments 206.

Currents flowing through the antenna elements 206 may be in opposite directions. For example, if the current in antenna element 206-A is flowing from left to right in FIG. 2A, the current in antenna element 206-B (and its adjacent elements) may be flowing from right to left. In some embodiments (e.g., when the transmitting antenna 110 and the receiving antenna 124 are separated from each other by a non-zero distance), since the antenna elements 206 are formed by grounded lines and are much smaller than the wavelength, and due to the opposite flow of current through the transmitting antenna 110, substantially all (e.g., 85%, 90%, 95%, or more) of the electromagnetic radiation in a far-field region of the transmitting antenna 110 gets cancelled. As one example, the far-field electromagnetic radiation generated by one or more antenna elements 206 left of an imaginary line 215 is cancelled out by the far-field electromagnetic radiation generated by one or more antenna elements 206 right of the line 215. In some other embodiments (e.g., when the receiving antenna 124 is positioned on the transmitting antenna 110), opposite flows of current results in cancellation of a portion of the current (e.g., an undesired portion of the current that should not be transmitted to the receiving antenna 124). In either embodiment, transmission of electromagnetic radiation into the far-field region from the transmitting antenna 110 is substantially eliminated (e.g., 85%, 90%, 95%, or more of all far-field electromagnetic radiation from the transmitting antenna 110 is eliminated). Such cancellation, however, may not occur in a near-field active zone of the transmitting antenna 110, where the transfer of power may occur (e.g., between the transmitting antenna 110 and the receiving antenna 124). Thus, the spiral design of the transmitting antenna 110 facilitates wireless charging using electromagnetic energy, while also minimizing propagation of electromagnetic energy away from a desired charging space (i.e., minimizing propagation of electromagnetic energy into the far field).

Figure 2B:
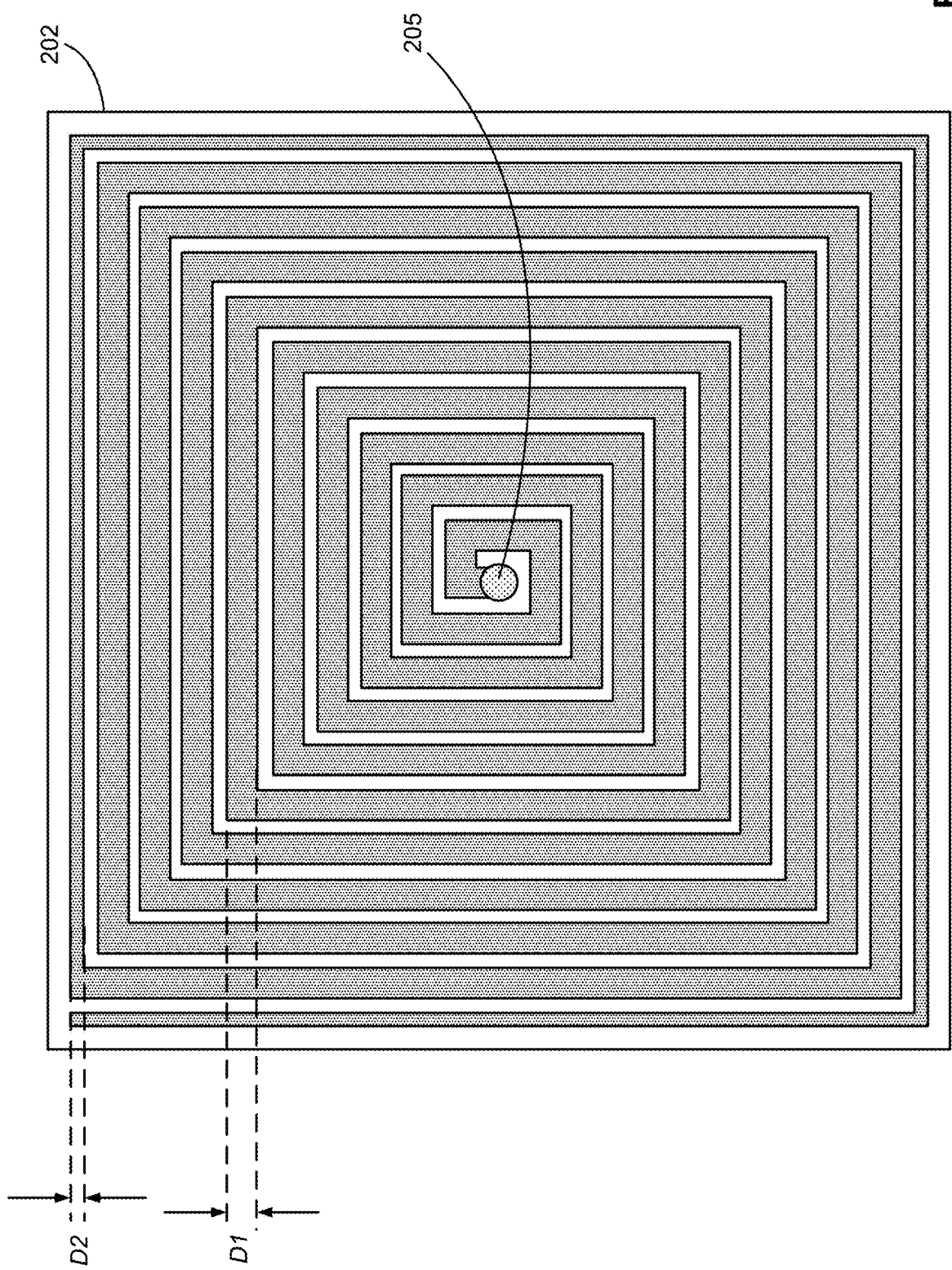

In some embodiments, the transmitting antenna 110 includes a ground plane 207 (shown in FIG. 4A) at or above a bottom surface of the substrate 202. The ground plane 207 may be formed by materials such as metal, alloys, and composites. In an embodiment, the ground plane 207 may be formed by copper or a copper alloy. In some embodiments, the ground plane 207 may be constructed of a solid sheet of material. In other embodiments, the ground plane 207 may be constructed using material strips arranged in shapes such as loops, spirals, and meshes. As shown in FIG. 2B, a via 205 carrying a power feed line (not shown) to the antenna 204 may pass through the ground plane 207. The power feed line may supply current to the antenna 204. In some embodiments, the ground plane 207 may be electrically connected to the antenna 204. In some embodiments, the ground plane 207 may not be electrically connected to the antenna 204. In such embodiments, the via 205 is separated and insulated from the ground plane 207. In some embodiments, the ground plane 207 may act as a reflector of electromagnetic waves generated by the antenna 204. In other words, the ground plane 207 may not allow electromagnetic transmission beyond the bottom surface of the transmitting antenna 110 by cancelling and/or reflecting the transmission image formed beyond the bottom surface. Reflecting electromagnetic waves by the ground plane 207 may reinforce the electromagnetic waves transmitted by the antenna 204 from or towards the top surface of the substrate 202. Therefore, leakage of electromagnetic power from the bottom surface of the substrate 202 is minimized, and in some cases, eliminated. The via 205 may be positioned in a center of the substrate 202 (as shown in FIG. 2B) or the via 205 may be offset from the substrate 202's center in one or more directions.

Due to the arrangement of the antenna 204 and the ground plane 207, electromagnetic waves transmitted by the transmitting antenna 110 accumulate in the near field of the transmitting antenna 110. Importantly (e.g., for compliance with safety regulations governing wireless charging), leakage of electromagnetic energy into the far field is minimized or eliminated (for the reasons discussed above).

Figure 3A:
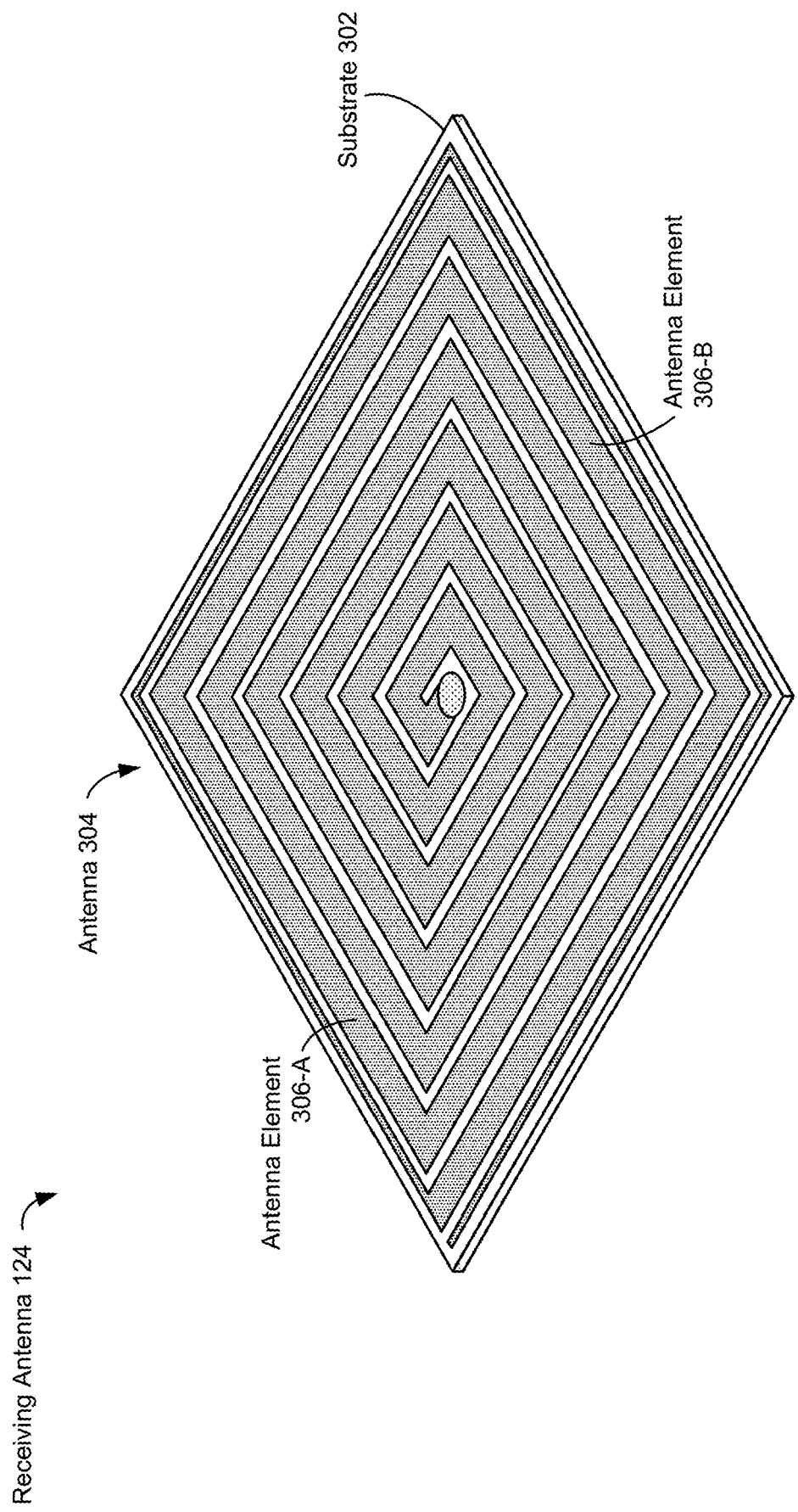
FIGS. 3A to 3C shows various views of an example receiving antenna in accordance with some embodiments.

FIG. 3A shows a top perspective view of a receiving antenna 124 used in the example near-field power transfer system. In some embodiments, the receiving antenna 124 is housed by a housing constructed of a material creating minimal obstructions for electromagnetic waves to pass through. In other embodiments, different portions of the housing may be constructed with materials having different electromagnetic properties such as permeability and permittivity. As one example, a top surface of the housing may allow electromagnetic waves to pass through with minimal obstruction while the sidewalls of the housing may obstruct electromagnetic waves by attenuation, absorption, reflection, or other techniques known in the art.

The receiving antenna 124 is configured to receive RF energy (e.g., electromagnetic waves/signals), and thus receive power when adjacent to the transmitting antenna 110 (discussed above with reference to FIGS. 2A to 2B). FIG. 5 shows one example of an electronic device 122, with a receiving antenna 124 integrated therein, positioned on a transmitted pad 500 (e.g., one example of the transmitter 102, FIG. 1A), having a transmitting antenna 110 integrated therein. As shown, the receiving antenna 124 is adjacent to the transmitting antenna 110, and in this arrangement, wireless power transfer occurs with high efficiency (e.g., greater than 90% efficiency). In some embodiments, the receiving antenna 124 (or subcomponents of the receiving antenna 124) may be integrated into a receiver device 120, or may be externally wired to the receiver device 120 (FIG. 1A). While not shown in FIG. 5, the transmitting antenna 110 and the receiving antenna 124 may be embedded in their respective devices (e.g., the transmitter 102 and the receiver 120).

The receiving antenna 124 may include a substrate 302, which can be disposed within a space defined between the top surface, sidewalls, and the bottom surface of the housing. In some embodiments, the receiving antenna 124 may not include the housing and instead the substrate 302 may include the top surface, sidewalls, and the bottom surface. The substrate 302 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may generate radiation, and may act as thin reflectors.

The receiving antenna 124 includes an antenna 304 (also referred to herein as a "radiator element," or a "radiator"). The antenna 304 may be constructed on or below the top surface of the housing (or the substrate 302). As mentioned above, the receiving antenna 124 is associated with power receiving, and thus, the antenna 304 is used for receiving electromagnetic waves (e.g., waves 116). The antenna 304 may be constructed from materials such as metals, alloys, metamaterials and composites. For example, the antenna 304 may be made of copper or copper alloys. The antenna 304 may be constructed to have different shapes based on power transfer requirements. For example, in FIGS. 3A and 3B, the antenna 304 is constructed in a shape of a spiral including antenna elements 306 (also referred to herein as "antenna segments") that are disposed close to each other. In the illustrated embodiment, the antenna 304 includes six full turns (i.e., six complete revolutions). It is noted that various turn amounts can be used, so long as the number of turns is less than the number of turns made by the antenna 204 of the transmitting antenna 110.

In some embodiments, a width of antenna elements 306 varies from one turn to the next. Put another way, a surface area of a respective antenna element 306 may differ from a surface area of at least one other antenna element 306. For example, with reference to FIG. 3B, the outer most antenna element 306 of the antenna 304 has a width of $D^4$, while the other antenna elements each has a width of $D^3$, which is greater than the width of $D^4$. In some embodiments, each revolution of the antenna 304 may have a different width (e.g., a width of the antenna 304 may progressively increase (or decrease) with each revolution of the antenna 304). Varying the widths of the antenna elements 306 can be used to adjust a surface area of the antenna 304, and in turn, adjust an operating frequency of the antenna 304. In some embodiments, an arrangement of the antenna elements 306 (e.g., the number of turns) and a surface area of each antenna element 306 are optimized according to a design of the antenna 204 of the transmitting antenna 110. It is noted that, in some embodiments, the antenna 304 is continuous (e.g., a continuous spiral) while in other embodiments the antenna 304 is composed of contiguous antenna segments 306.

Much like the transmitting antenna 110, in some embodiments, the receiving antenna 124 includes a ground plane 307 (shown in FIG. 4B) at or above a bottom surface of the substrate 302. The ground plane 307 may be formed by materials such as metal, alloys, and composites. In some embodiments, the ground plane 307 may be formed by copper or a copper alloy. In some embodiments, the ground plane 307 may be constructed of a solid sheet of material. In other embodiments, the ground plane 307 may be constructed using material strips arranged in shapes such as loops, spirals, and meshes. As shown in FIG. 3B, a via 305 carrying a power feed line (not shown) to the antenna 304 may pass through the ground plane 307. The power feed line may receive current from the antenna 304. In some embodiments, the ground plane 307 may be electrically connected to the antenna 304. In some embodiments, the ground plane 307 may not be electrically connected to the antenna 304. In such embodiments, the via 305 is separated and insulated from the ground plane 307. In some embodiments, the ground plane 307 may act as a reflector. In other words, the ground plane 307 may not allow electromagnetic transmission beyond the bottom surface of the receiving antenna 124 by cancelling and/or reflecting the transmission image formed beyond the bottom surface. Reflecting the electromagnetic waves by the ground plane 307 may reinforce the electromagnetic waves received by the antenna 304.

Figure 3B:
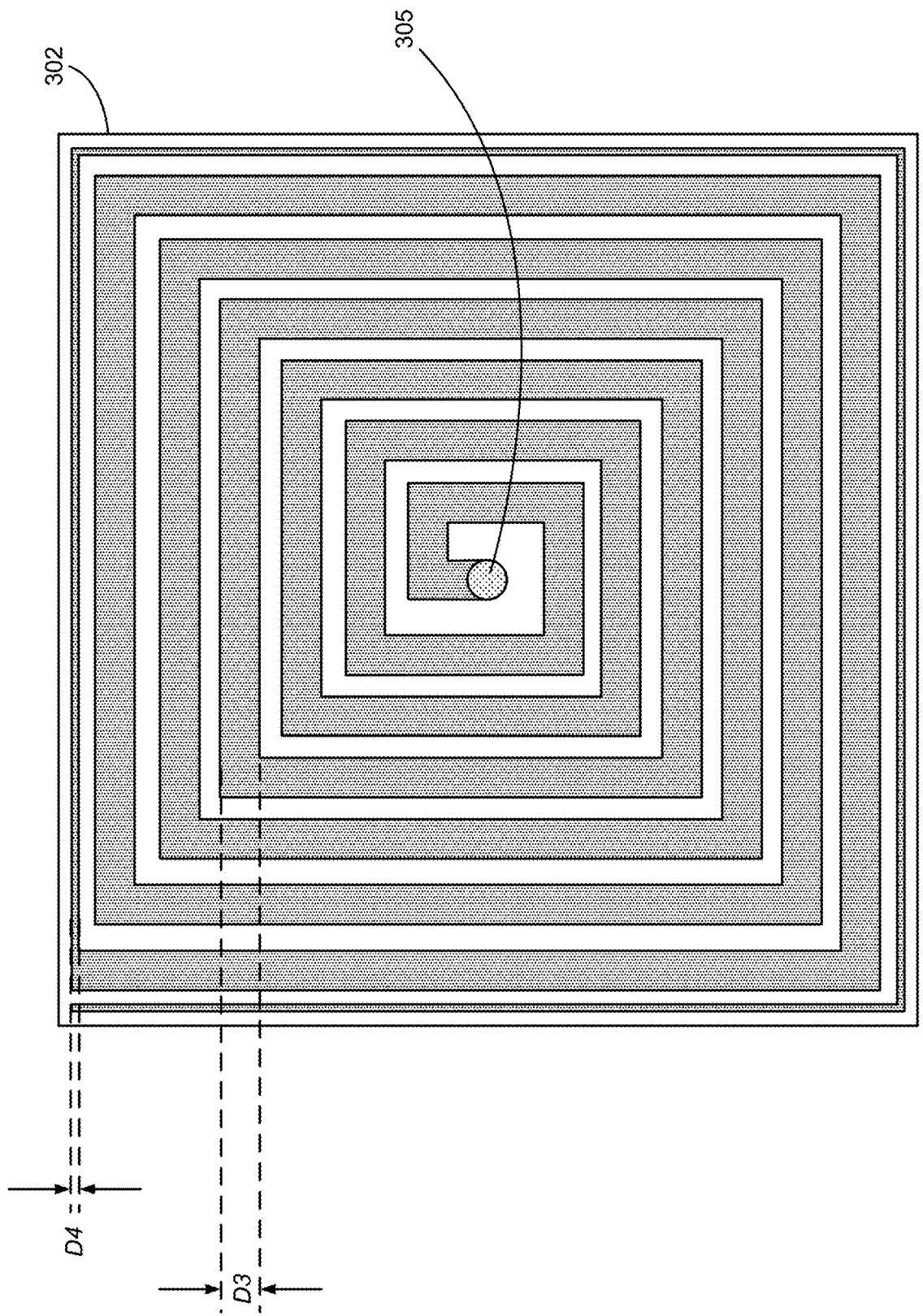
Figure 3C:
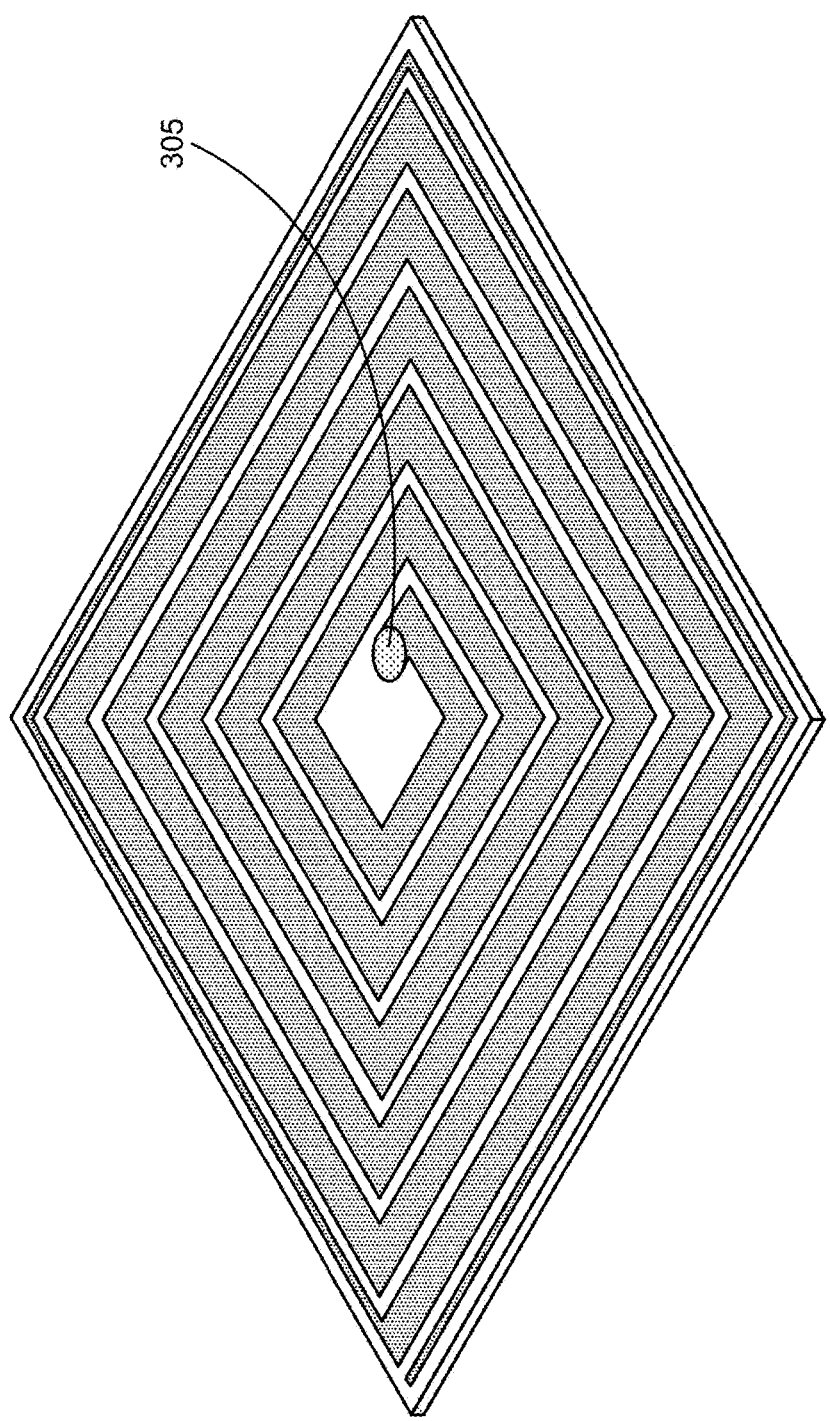

The via 305 may be positioned in a center of the substrate 302 (as shown in FIG. 3B) or the via 305 may be offset from the substrate 302's center in one or more directions (as shown in FIG. 3C).

FIG. 3C shows another embodiment of the receiving antenna 124.

Specifically, in FIG. 3C, the via 305 is not positioned in a center of the substrate 302. Instead, the via 305 is offset towards one or more of the sides of the substrate 302. In doing so, the via 305 is not coaxially aligned with the via 205 of the transmitting antenna 110, e.g., when the transmitting antenna 110 and the receiving antenna 124 are positioned adjacent each other. The coaxial misalignment between the via 205 and the via 305 can be used to optimize the matching of the antennas in asymmetrical port assignment (i.e. where each antenna is terminated with a different port impedances).

Figure 4A:
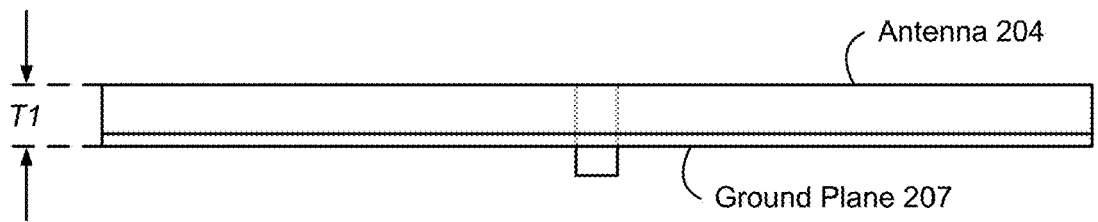
FIG. 4A shows a side view of an example transmitting antenna in accordance with some embodiments
Figure 4B:
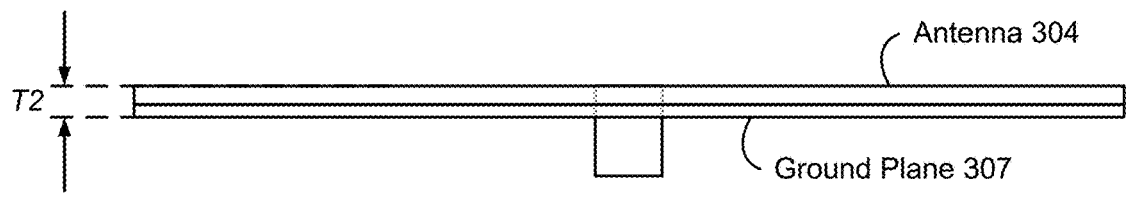
FIG. 4B shows a side view of an example receiving antenna in accordance with some embodiments

FIGS. 4A and 4B show cross-sectional views of the transmitting antenna 110 and the receiving antenna 124, respectively. As shown in FIG. 4A, the transmitting antenna 110 has a first thickness (T1), which may range from 20 mm to 100 mm. As shown in FIG. 4B, the receiving antenna 124 has a second thickness (T2), which may range from 5 mm to 25 mm, that is less than the first thickness (T1). In one example, the first thickness (T1) is approximately 100 mm while the second thickness (T2) is approximately 10 mm. In another example, the first thickness (T1) is approximately 50 mm while the second thickness (T2) is approximately 20 mm. Various other thicknesses can be used in addition to the examples provided above. In some embodiments, the first thickness (T1) is at least 20% greater than the second thickness (T2). In some embodiments, the first thickness (T1) is between 20-1000% greater than the second thickness (T2). The thickness differences are used to achieve high coupling between the transmitting antenna 110 and the receiving antenna 124 in an asymmetrical system in which each antenna is terminated in a different port impedances (e.g., reducing the thickness of the antenna can help in reducing a port impedance of the receiving antenna 124, relative to a port impedance of the transmitting antenna 110). In some embodiments, the thickness measurements of the transmitting antenna 110 and the receiving antenna 124 include the respective ground planes, while in other embodiments the respective ground planes are omitted from the thickness measurements.

As mentioned above, a higher coupling efficiency is achieved by designing the antenna 204 on the transmitter side to have more turns (i.e., revolutions, loops) than the antenna 304 on the receiver side. Additionally, widths of the antenna 204 (e.g., $D^1$ and $D^2$) are different from widths of the antenna 304 (e.g., $D^3$ and $D^4$) (e.g., widths $D^3$ and $D^4$ are greater than widths $D^1$ and $D^2$, respectively). Differences in widths and number of turns can be used to lower a port impedance of the receiving antenna 124. To illustrate, in one example, the transmitting antenna 110 may have a port impedance of approximately 50 ohms, while the receiving antenna 124 may have a port impedance of approximately 5 ohms (e.g., the low port impedance may be required for a specific application). The receiving antenna 124 is able to achieve the low port impedance of 5 ohms by (i) reducing the number of turns made by the antenna 304 relative to the number of turns made by the antenna 204, and (ii) increasing a width (or widths) of the antenna 304 relative to a width (or widths) of the antenna 110. Also, the receiving antenna 124 is able to achieve the low port impedance by reducing a thickness of the receiving antenna 124, relative to a thickness of the transmitting antenna 110, and offsetting the via 305, at least in some embodiments, from a center of the receiving antenna 124.

Thus, in short, in order to achieve high coupling efficiency and TX-RX port transformation, non-identical antennas (e.g., transmitting antenna 110 and receiving antenna 124) are optimized as a pair. The optimization is achieved through: (i) increasing a thickness of the transmitting antenna 110 relative to a thickness of the receiving antenna 124, as shown in FIGS. 4A and 4B, (ii) increasing a number of turns made by the antenna 204 of the transmitting antenna 110 relative to a number of turns made by the antenna 304 of the receiving antenna 124, as shown in FIGS. 2A and 3A, (iii) varying a spacing and width of antenna segments 206 of the antenna 204 of the transmitting antenna 110 relative to a spacing and width of antenna segments 306 of the antenna 304 of the receiving antenna 124, and (iv) optionally offsetting the vias feeding the antennas 204 and 304 (e.g., in radius and feed clearance), as shown in FIG. 3C. Thus, the asymmetric nature of the coupled antennas provide more degrees of freedom to optimize them for a system with different port impedances.

FIG. 6 is a block diagram 600 illustrating an interaction between the transmitting antenna 110 and the receiving antenna 124 (e.g., when the transmitting antenna 110 and the receiving antenna 124 are positioned adjacent to each other and transferring wireless power). As shown, one or more power amplifiers are connected to the transmitting antenna 110 and are configured to provide signals to the transmitting antenna 110. The transmitting antenna 110 uses the signals provided by the one or more power amplifiers to generate electromagnetic waves, which are harvested by the receiving antenna 124. As also shown, the transmitting antenna 110 and the receiving antenna 124 are separated by one or more housings 602. The one or more housings 602, in some embodiments, are distinct antenna covers for the transmitting antenna 110 and the receiving antenna 124. In addition or separately, the one or more housings 602 may be housings of an electronic device 122 (e.g., a mobile phone's housing) and/or a transmitter pad/device 102.

Wireless power harvested by the receiving antenna 124 is provided to a receiver integrated circuit 126. The receiver integrated circuit 126 is configured to convert the harvested wireless power into useable power and provide the useable power to a load 606 (e.g., a battery, power supply, etc.) of an electronic device 122. Importantly, the receiver integrated circuit 126 is designed to convert high input power to useable power (i.e. over 20 Watt) on the receiver side for a certain output voltage, such as 20 V. To accomplish this, the receiver integrated circuit 126 has low input port impedances (e.g., about 10 times lower than an ideal impedance value of 50 Ohm).

Figure 7A:
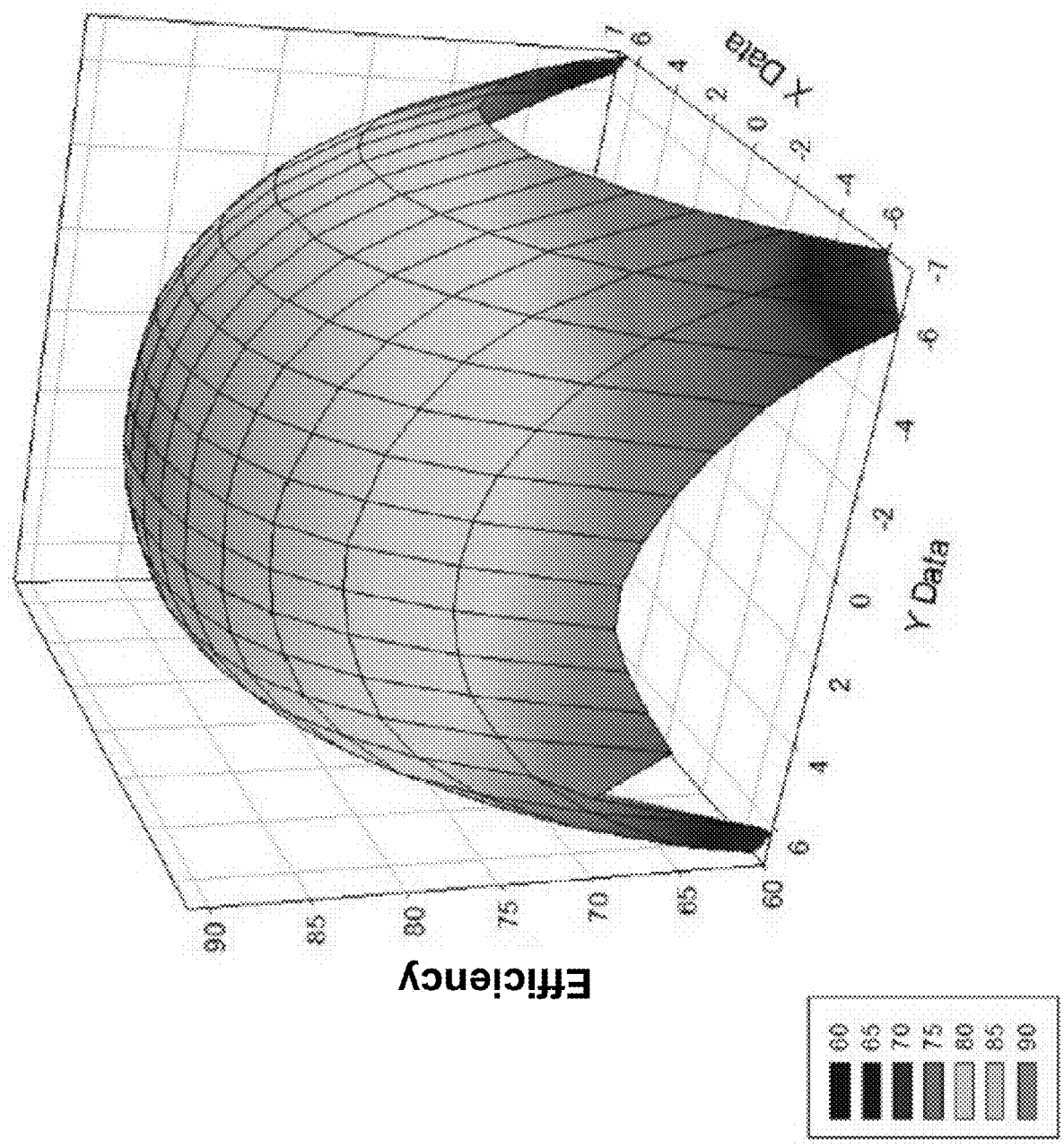
FIGS. 7A and 7B show energy transfer efficiencies of a receiving antenna and transmitting antenna.
Figure 7B:
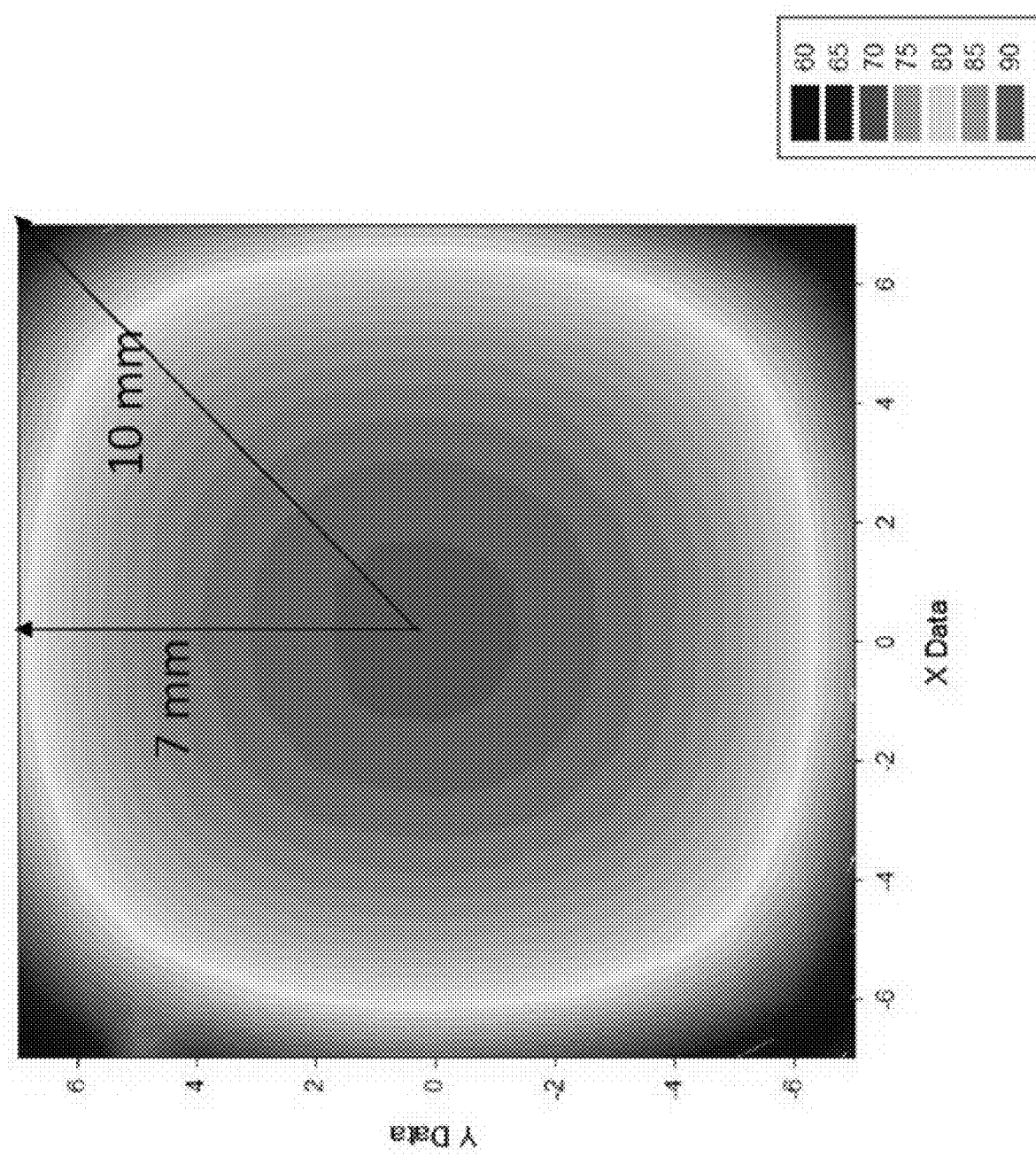

FIGS. 7A and 7B show energy transfer efficiencies of the receiving antenna 124 and transmitting antenna 110. As shown, the receiving antenna 124 and transmitting antenna 110 are able to achieve an energy transfer efficiency of 90%. Importantly, the receiving antenna 124 and transmitting antenna 110 are able to maintain an energy transfer efficiency even when misaligned (e.g., when the receiving antenna 124 and transmitting antenna 110 are offset by approximately 4 mm, an energy transfer efficiency greater than 80% is achieved). Furthermore, the receiving antenna 124 and transmitting antenna 110 are able to achieve the high energy transfer efficiency while operating at a low frequency. For example, the transmitting antenna 110 may be configured to operate at between 30 and 100 MHz (preferably 40 MHz), meaning that electromagnetic waves radiated by the antenna 204 have wavelengths between approximately 10 meters to 3 meters (preferably 7.5 meters). Nevertheless, even with these low frequencies and large wavelengths, the example near-field power transfer system of FIGS. 2A through 4B remains highly efficient.

In light of these principles, example embodiments are provided below.

In accordance with some embodiments, a near-field charging system for wirelessly charging electronic devices using electromagnetic energy having a low frequency (e.g., below 100 MHz, preferably below 60 MHz) is provided. The near-field charging system includes a transmitting antenna (e.g., transmitting antenna 110, FIG. 2A), including a first substrate (e.g., substrate 202, FIG. 2A) and a first antenna (e.g., antenna 204, FIG. 2A), coupled to the first substrate, that follows a first meandering pattern having a first length. For example, with reference to FIG. 2A, the antenna 204 of the transmitting antenna 110 is a first spiral pattern with a first number of revolutions (e.g., ten complete revolutions).

The near-field charging system also includes a receiving antenna (e.g., receiving antenna 124, FIG. 3A), including a second substrate (e.g., substrate 302, FIG. 3A) and a second antenna (e.g., antenna 304, FIG. 3A), coupled to the second substrate, that follows a second meandering pattern having a second length. For example, with reference to FIG. 3A, the antenna 304 of the receiving antenna 124 is a second spiral pattern with a second number of revolutions, whereby the second number of revolutions is less than the first number of revolutions made by the antenna 204. In addition, the second length is less than the first length.

In some embodiments of the near-field charging system, the transmitting antenna is configured to transmit electromagnetic energy having a frequency at or below 60 MHz (e.g., between 30 MHz and 50 MHz, preferably 40 MHz) to the receiving antenna at an efficiency above 90%, and the receiving antenna is coupled to power-conversion circuitry (e.g., receiver integrated circuit 126, FIG. 6) for converting the electromagnetic energy into usable power for charging or powering an electronic device that is coupled to the receiving antenna and the power-conversion circuitry.

In the near-field charging system, the transmitting antenna has a first port impedance and the receiving antenna has a second port impedance that is less than the first port impedance. For example, the first port impedance may be between 40 and 60 Ohms (preferably 50 Ohms), and the second port impedance may be between 1 and 20 Ohms (preferably 5 Ohms). A difference between the first port impedance and the second port impedance can be attributed to, at least in part, differences between the first meandering pattern and the second meandering pattern. For example, as mentioned above, the first meandering pattern may be longer than the second meandering pattern, and this difference in length can contribute to the port impedance difference. Other factors contributing to the port impedance difference include but are not limited to: number of revolutions made by the first and second antennas, widths of the first and second antennas, thicknesses of the first and second substrates, and locations of feed lines (e.g., via 205 and via 305).

FIGS. 8A-9B are directed toward an example receiving antenna (e.g., an instance of the receiving antenna 124). In FIGS. 8A-9B, the example receiving antenna is similar to the receiving antenna discussed above with reference to FIGS. 3A-3C, but the receiving antenna addressed here also includes a parasitic element 810 that is used to make the receiving antenna less sensitive to misalignment with the transmitting antenna. In other words, incorporation of the parasitic element 810 in the receiving antenna helps to maintain a wireless power transfer efficiency within 10% of peak performance (e.g., peak performance being measured when the receiving antenna 124 and the transmitting antenna 110 are aligned center-to-center) for a defined range of movements/offset. As one example, the wireless power transfer efficiency stayed within 10% of peak performance when the receiving antenna 124 and the transmitting antenna 110 were misaligned, center-to-center, by one inch. In another example, the wireless power transfer efficiency stayed within 2% of peak performance when the receiving antenna 124 and the transmitting antenna 110 were misaligned, center-to-center, by one centimeter. Additional examples of misalignment are discussed below with reference to FIGS. 10A-10B.

Figure 8A:
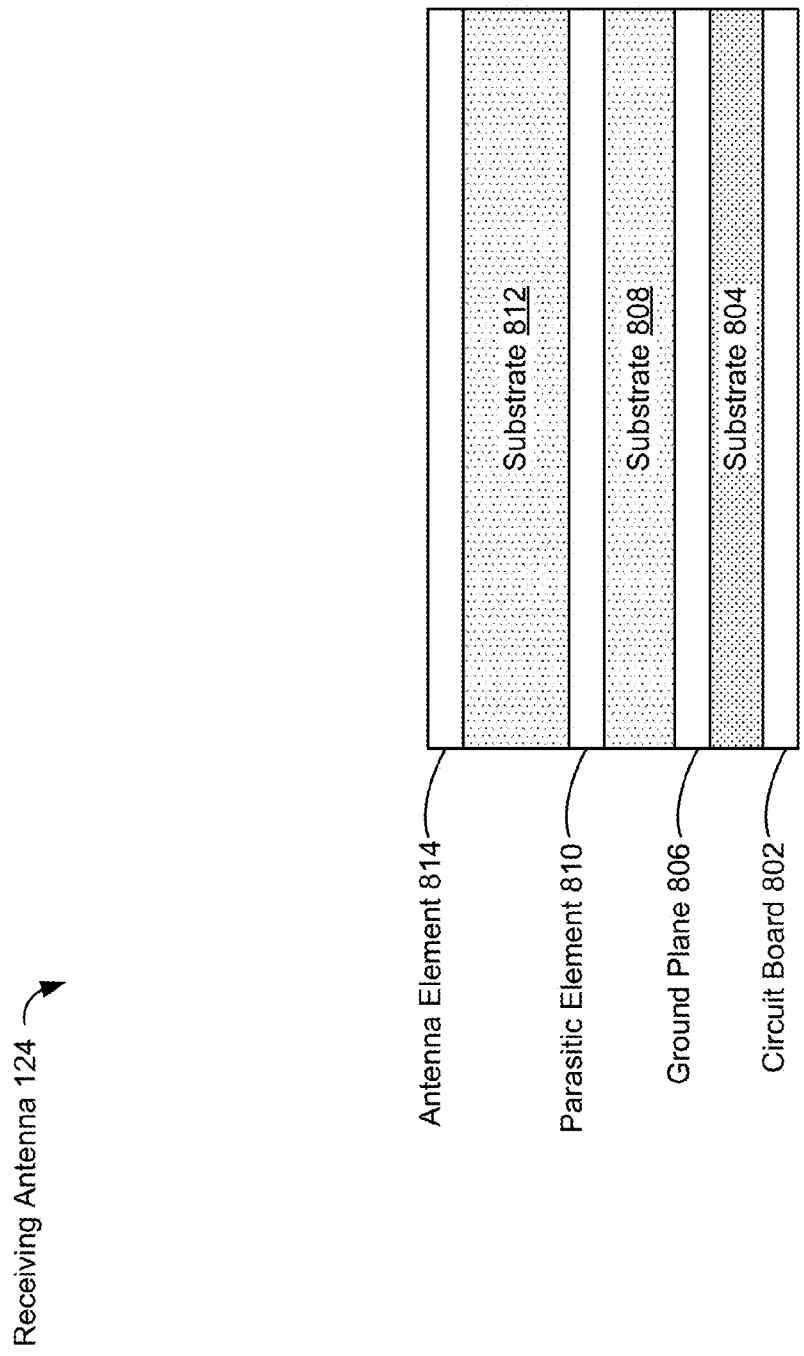
FIG. 8A shows a side view of an example receiving antenna having a parasitic element in accordance with some embodiments

FIG. 8A shows a side view of the example receiving antenna 124 having a parasitic element 810 in accordance with some embodiments. As shown, the receiving antenna 124 includes a circuit board 802, a ground plane 806, a substrate 804 separating the circuit board 802 and the ground plane 806, a parasitic element 810, a substrate 808 separating the parasitic element 810 and the ground plane 806, an antenna element 814, and another substrate 812 separating the parasitic element 810 and the antenna element 814. In some embodiments, the antenna element 814 is electrically isolated from the parasitic element 810 (e.g., by the substrate 812). The circuit board 802, ground plane 806, parasitic element 810, and antenna element 814 are discussed in further detail below. It is noted that the respective thicknesses of the components shown in FIG. 8A represent example thicknesses, and it should be understood that the thicknesses of the components could be different.

Figures 1, 8B:
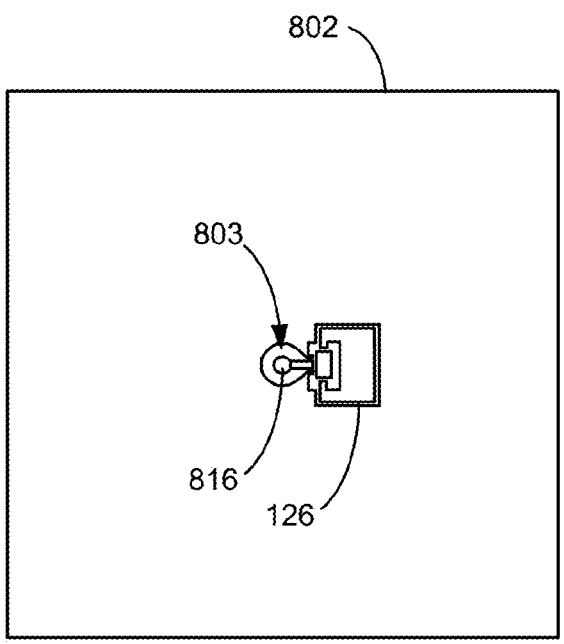
FIGS. 8B-1 to 8B-4 show the individual components of an example receiving antenna having a parasitic element in accordance with some embodiments
Figures 2, 8B:
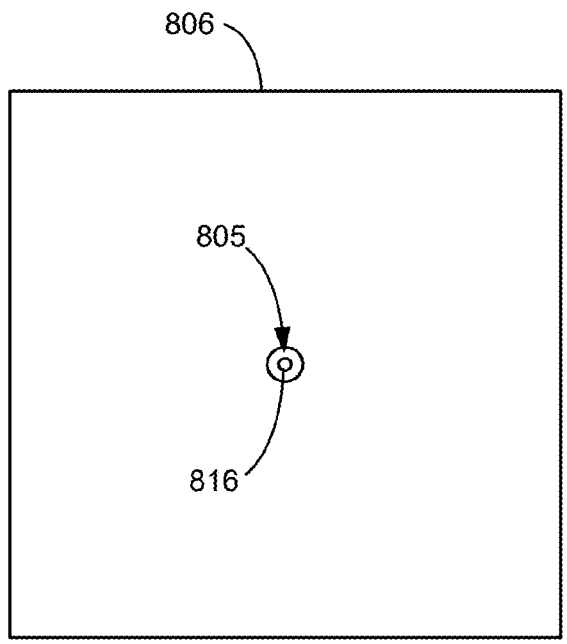
Figures 3, 8B:
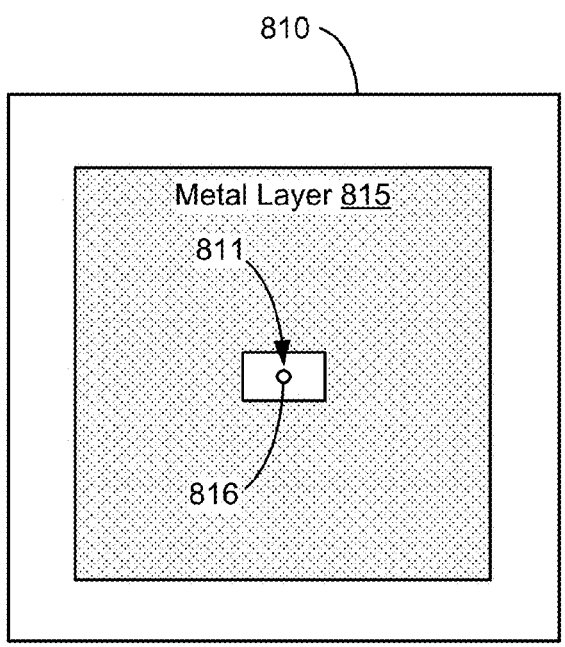
Figures 4, 8B:
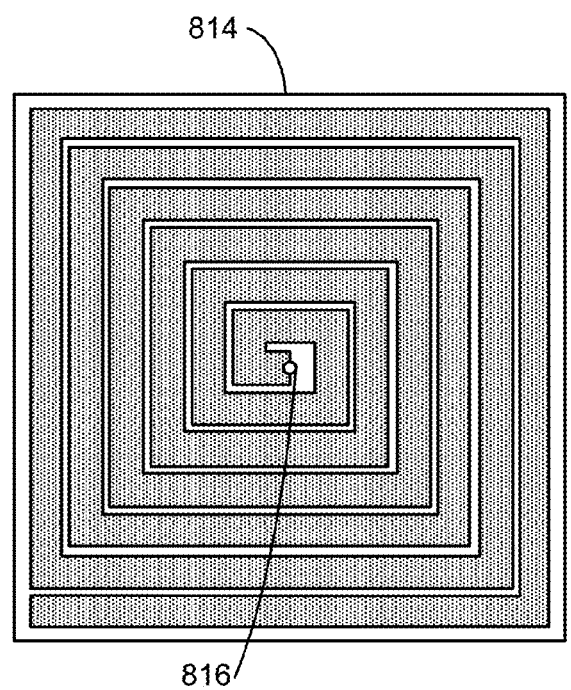

FIGS. 8B-1 to 8B-4 show the individual components of the example receiving antenna 124 in accordance with some embodiments. Starting with FIG. 8B-1, the circuit board 802 (e.g., a printed circuit board) defines a first opening 803 that is sized to receive a transmission line 816, which supplies current to the circuit board 802 from the antenna element 814. The circuit board 802 also includes one or more power converters 126, and the transmission line 816 is connected to the one or more power converters 126. In some embodiments, the circuit board 802 also includes one or more of the components shown in FIG. 1A for the receiver 120, e.g., one or more of the communications components 144, the processors 140, the memory 142, and the receiver sensors 128.

FIG. 8B-2 shows the ground plane 806 of the receiving antenna 124. The ground plane 806 is an example of the ground plane 307 discussed above with reference to FIG. 4B. The ground plane 806 may be formed by materials such as metal, alloys, and composites (e.g., ground plane 806 may be formed by copper or a copper alloy). As shown in FIG. 8B-2 (and like the circuit board 802), the ground plane 806 defines a second opening 805 that is sized to receive the transmission line 816. In some embodiments, the ground plane 806 may be electrically connected to the antenna 204. In some other embodiments, the ground plane 207 is not electrically connected to the antenna element 814. In such embodiments, the transmission line 816 is separated and insulated from the ground plane 806. The ground plane 806 may act as a reflector of electromagnetic waves radiated toward the receiving antenna 124. In other words, the ground plane 806 may not allow electromagnetic transmission beyond the ground plane 806 by cancelling and/or reflecting the electromagnetic transmission. Reflecting electromagnetic waves by the ground plane 806 may reinforce the electromagnetic waves received by the receiving antenna 124.

FIG. 8B-3 shows the parasitic element 810 of the receiving antenna 124. The parasitic element 810 may be formed by a metal layer 815, which is made from materials such as metal, alloys, and composites (e.g., the parasitic element 810 may be formed by copper or a copper alloy). As shown in FIG. 8B-3 (and like the circuit board 802 and the ground plane 806), the parasitic element 810 defines a third opening 811 that is sized to receive the transmission line 816. Notably, the parasitic element 810 is not electrically connected to the transmission line 816 (e.g., the second opening 805 electrically insulates the parasitic element 810 from the transmission line 816, and/or the transmission line 816 includes an insulating jacket). In some embodiments, the parasitic element 810 may disrupt energy field distributions around the receiving antenna 124. The degree of disruption caused by the parasitic element 810 to the energy field distributions around the receiving antenna 124 is dependent, at least in part, on a shape of the parasitic element 810.

Various example shapes of the parasitic element 810 are discussed below with reference to FIGS. 8C-1 to 8C-3.

FIG. 8B-4 shows the antenna element 814. The antenna element 814 is an example of the antenna element 306, and for the sake brevity, duplicate description of the antenna element 306 is not repeated here. As shown, a central portion of the antenna element 814 is connected to the transmission line 816, such that energy harvested by the antenna element 814 is conveyed to the power converters 126 by the transmission line 816. It is noted that the transmission line 816 may be an example of the via 305, which is discussed above with reference to FIGS. 3A-3C.

Figures 3, 8C:
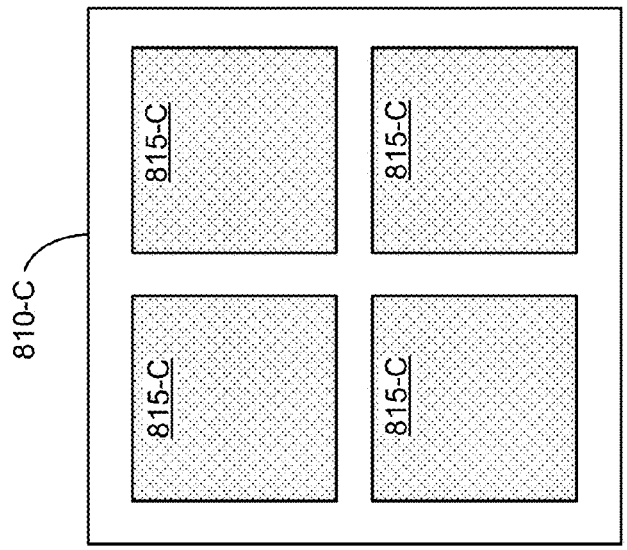
Figures 2, 8C:
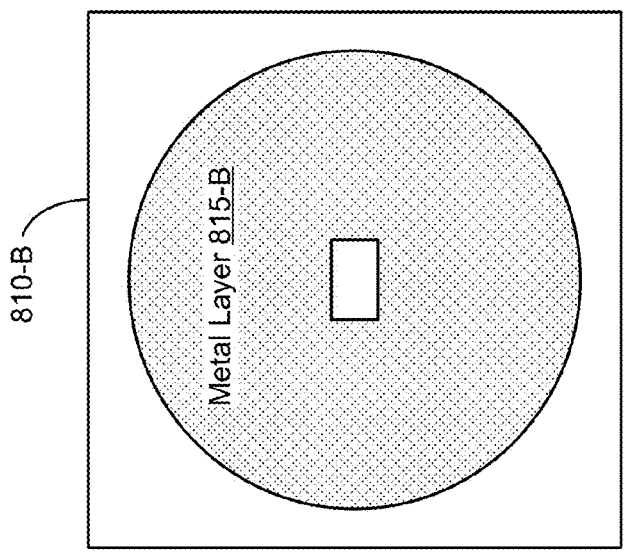
Figures 1, 8C:
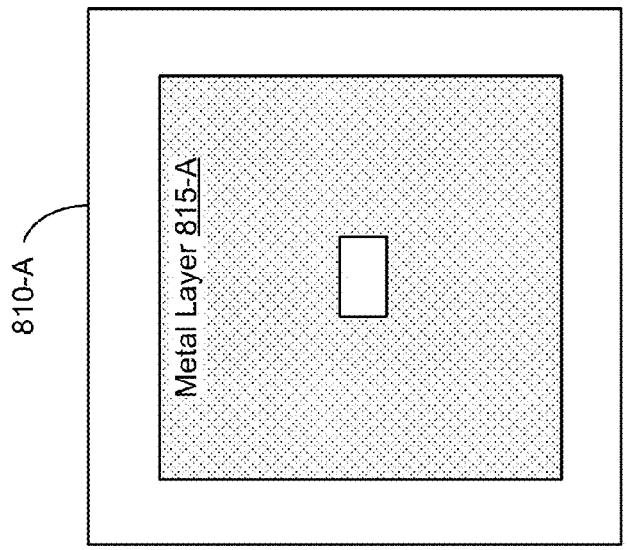
Figure 9B:
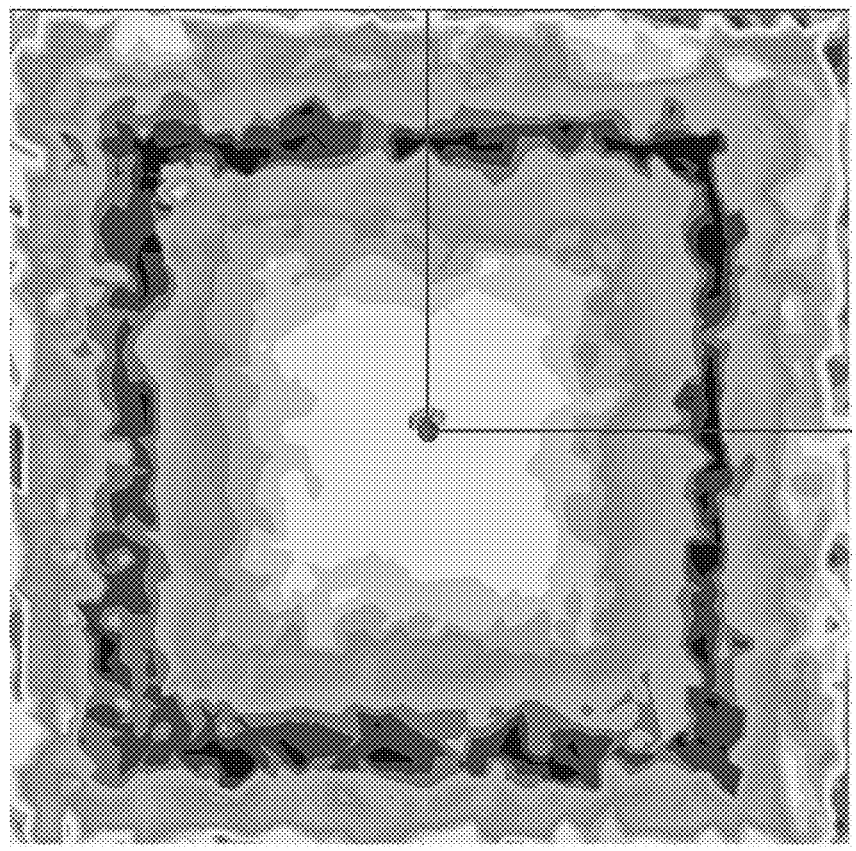
FIG. 9B shows energy transfer efficiencies of an example receiving antenna with a parasitic element.
Figure 9A:
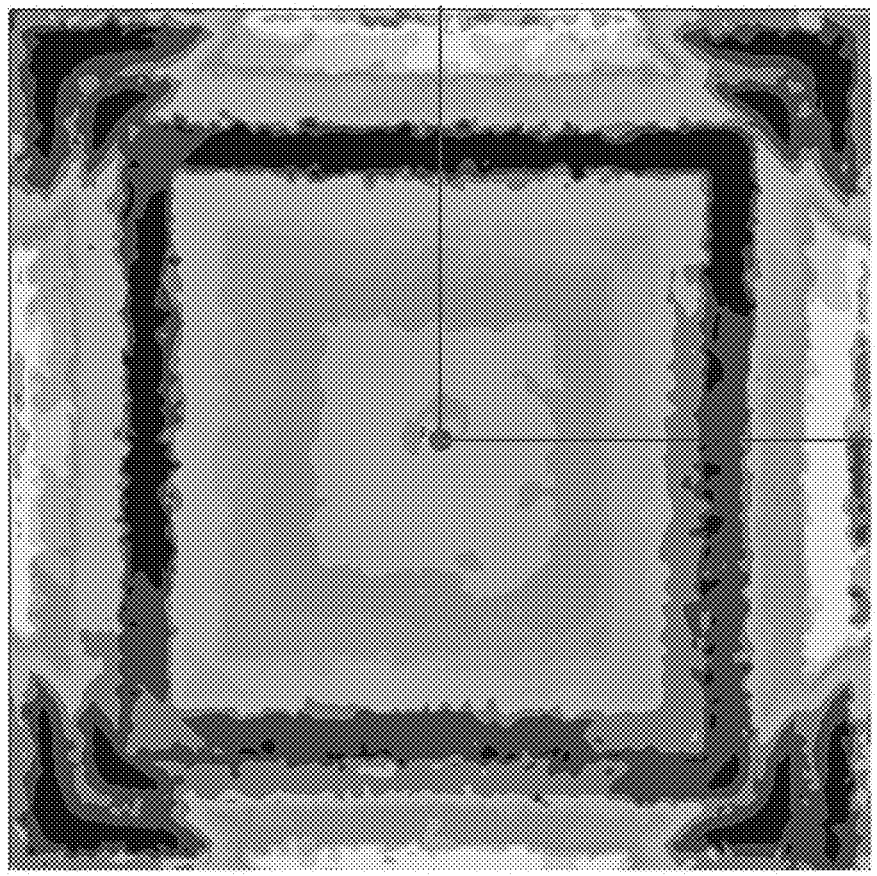
FIG. 9A shows energy transfer efficiencies of an example receiving antenna lacking a parasitic element.

FIGS. 8C-1 to 8C-3 show various examples of the parasitic element 810. With reference to FIG. 8C-1, the parasitic element 810-A is rectangular shaped with a central opening for the transmission line 816 to pass through. The rectangular shape of the parasitic element 810-A disrupts energy field distributions around the receiving antenna 124 is a first manner, which is shown in FIG. 9B. With reference to FIG. 8C-2, the parasitic element 810-B is circular shaped with a central opening for the transmission line 816 to pass through. The circular shape of the parasitic element 810-B disrupts energy field distributions around the receiving antenna 124 is a second manner distinct from the first manner. Finally, with reference to FIG. 8C-3, the parasitic element 810-C includes multiple rectangular-shaped parts separated from one another so that the transmission line 816 can pass through. The rectangular-shaped parts of the parasitic element 810-C disrupt energy field distributions around the receiving antenna 124 is a third manner distinct from the first and second manners. The benefits (and drawbacks) of disrupting the energy field distributions around the receiving antenna 124 through the use of a shaped parasitic element 810 are discussed below with reference to FIGS. 9A-9B and 10A-10B FIGS. 9A and 9B show example receiving antennas with and without the parasitic element 810. Starting with 9A, the receiving antenna 124 does not include the parasitic element 810. As shown, the energy field distributions around the receiving antenna 124 is well defined and consistent. The energy field distributions shown in FIG. 9A correspond to the energy field distributions created by the receiving antenna 124 shown in FIGS. 3A-3C and 4B. As discussed in relation to those figures, the receiving antenna 124 is highly efficient, surpassing a 90% efficiency.

FIG. 9B shows energy transfer efficiencies of an example receiving antenna with the parasitic element 810. As shown, the energy field distributions around the receiving antenna 124 are less defined and consistent relative to the energy field distributions shown in FIG. 9A. The result shown in FIG. 9B is caused by the receiving antenna 124 having the parasitic element 810, which is adapted to disrupt the energy field distributions around the receiving antenna 124 (as discussed above at FIGS. 8A-8C). Consequently, while still highly efficient, the receiving antenna 124 of FIG. 9B is slightly less efficient than the receiving antenna 124 of FIG. 9A (e.g., when the transmitting and receiving antennas are aligned center-to-center).

While the receiving antenna 124 of FIG. 9B is slightly less efficient, disrupting the energy field distributions around the receiving antenna 124 is beneficial in near-field charging systems because users generally do not place the electric device on, e.g., a transmitter pad, so that the transmitting antenna 110 and the receiving antenna are perfectly aligned center-to-center. Rather, what typically occurs is that the transmitting antenna 110 and the receiving antenna 124 are misaligned to some degree (e.g., misaligned by an inch or less), and having energy field distributions around the receiving antenna 124 that are less defined (as shown in FIG. 9B) accommodates the misalignment between the transmitting antenna 110 and the receiving antenna. To repeat an example from above, a wireless power transfer efficiency stayed within 10% of peak performance when the receiving antenna 124 (which include the parasitic element 810) and the transmitting antenna 110 were misaligned, center-to-center, by one inch.

Figure 10B:
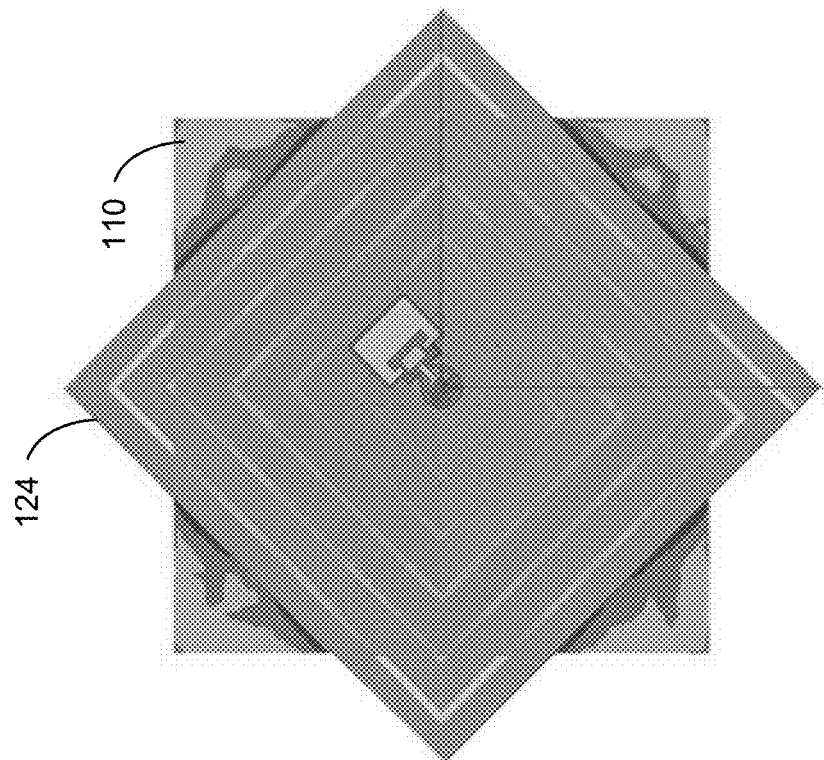
FIG. 10B shows energy transfer efficiencies of an example receiving antenna with a parasitic element misaligned with a transmitting antenna.
Figure 10A:
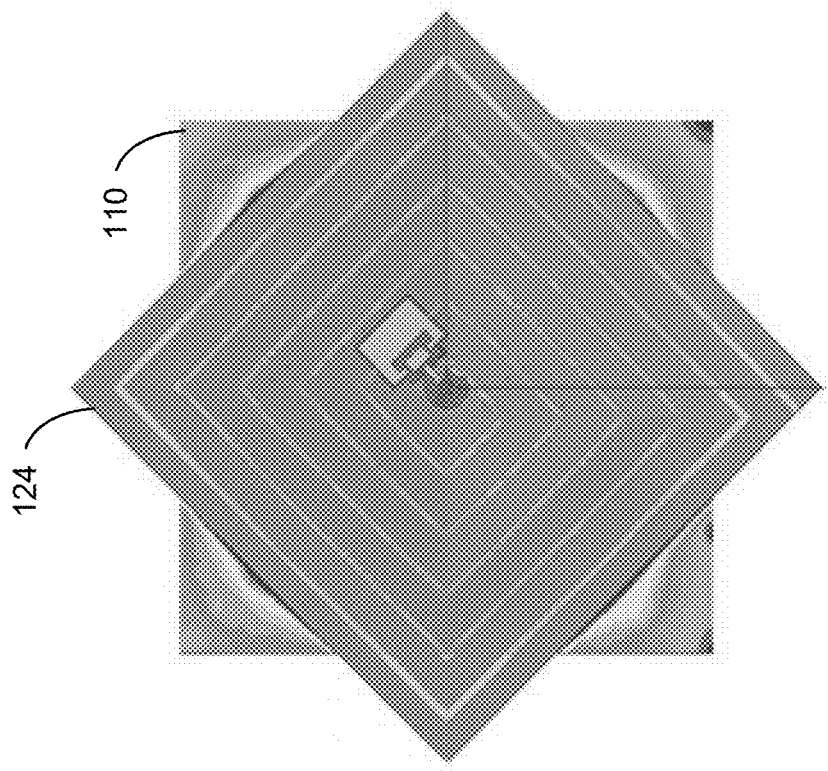
FIG. 10A shows energy transfer efficiencies of an example receiving antenna lacking a parasitic element misaligned with a transmitting antenna.

FIGS. 10A and 10B show example receiving antennas with and without the parasitic element 810. In both figures, the receiving antenna 124 is rotated relative to the transmitting antenna, which causes a misalignment between the two antennas. Starting with 10A, the receiving antenna 124 does not include the parasitic element 810 and, as indicated by the blue, green, and yellow colors in FIG. 10A, an amount of energy being transferred from the transmitting antenna 110 to the receiving antenna 124 is very low. In contrast, with reference to FIG. 10B, the receiving antenna 124 includes the parasitic element 810 and, as indicated by the red and orange colors in FIG. 10B, an amount of energy being transferred from the transmitting antenna 110 to the receiving antenna 124 is high, even though the antennas are misaligned.

Thus, in sum, while incorporating the parasitic element 810 into the receiving antenna 124 may cause a slight sacrifice in peak performance of the system (e.g., when the transmitting antenna 110 and the receiving antenna 124 are perfectly aligned center-to-center), incorporating the parasitic element 810 into the receiving antenna 124 results in the system being more versatile and user friendly as some degree of mobility is built into the system (e.g., the receiving antenna 124 can be misaligned with the transmitting antenna 110 to some degree and an efficient transfer of wireless power can still be achieved). Mobility in wireless charging systems is particularly important so that said systems can accommodate electric devices of varying sizes, as the precise location of the receiving antenna 124 is the devices will likely vary from device to device (e.g., mobile phone size varies from manufacture to manufacture and even within a given manufacture). Moreover, given that users tend to not align the target electric devices with the transmitting device perfectly (i.e., misalignment to some degree is foreseeable), the receiving device 120 and parasitic element 810 combination discussed herein provides a novel mechanism to address this foreseeable misalignment.

Figure 11A:
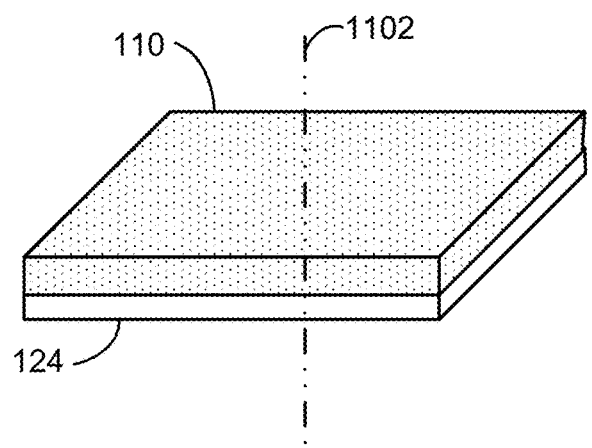
FIG. 11A shows an example receiving antenna aligned center-to-center with an example transmitting antenna.
Figure 11B:
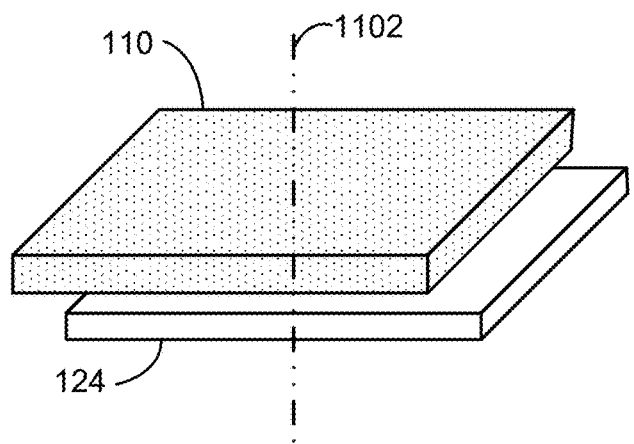
FIG. 11B shows an example receiving antenna misaligned with an example transmitting antenna.

To provide some additional context into the meaning of misalignment, FIG. 11A shows the receiving antenna 124 aligned center-to-center with the transmitting antenna 110 (i.e., not misaligned), while FIG. 11B shows the receiving antenna 124 misaligned with the transmitting antenna 110. At bottom, misalignment (i.e., center-to-center misaligned between the receiving and transmitting antennas) derives from the antenna of the receiving antenna 124 being offset from (as shown in FIG. 11B) and/or rotated relative to the antenna of the transmitting antenna 110 (as shown in FIG. 10B).

All of these examples are non-limiting and any number of combinations and multi-layered structures are possible using the example structures described above.

It will be understood that, although the terms "first," "second," etc. are used above to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" r or "when [a stated condition precedent is true]" or may be construed to mean "upon determining" or "in response to determining" or "in accordance with a determination" or "upon detecting" or "in response to detecting" that the stated condition precedent is true, depending on the context.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 106) can include, but is not limited to, high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory (e.g., 106, 134, and/or 142) optionally includes one or more storage devices remotely located from the CPU(s) (e.g., processor(s) 104, 132, and/or 140). Memory (e.g., 106, 134, and/or 142), or alternatively the non-volatile memory device(s) within the memory, comprises a non-transitory computer readable storage medium.

Stored on any one of the machine readable medium (media), features of the present invention can be incorporated in software and/or firmware for controlling the hardware of a processing system (such as the components associated with the transmitters 102 and/or receivers 120), and for enabling a processing system to interact with other mechanisms utilizing the results of the present invention. Such software or firmware may include, but is not limited to, application code, device drivers, operating systems, and execution environments/containers.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

What is claimed is:

1. A near-field charging system for wirelessly charging electronic devices using electromagnetic energy having a low frequency, the near-field charging system comprising:
   a transmitting antenna comprising:
      a first substrate; and
      a first antenna, coupled to the first substrate, that follows a first meandering pattern having a first length, wherein the transmitting antenna has a first port impedance; and
   a receiving antenna comprising:
      a second substrate; and
      a second antenna, coupled to the second substrate, that follows a second meandering pattern having a second length, wherein: (i) the second length is less than the first length, and (ii) the receiving antenna has a second port impedance that is less than the first port impedance,
   wherein:
      the transmitting antenna is configured to transmit electromagnetic energy having a low frequency at or below 60 MHz to the receiving antenna at an efficiency above 90%;
      the receiving antenna is coupled to power-conversion circuitry for converting the electromagnetic energy into usable power for charging or powering an electronic device that is coupled to the receiving antenna and the power-conversion circuitry;
      the second substrate includes opposing first and second surfaces, whereby the second antenna is coupled to the first surface; and
      the receiving antenna further comprises a parasitic element, coupled to the second surface of the second substrate, adapted to disrupt energy field distributions around the receiving antenna.

2. The near-field charging system of claim 1, wherein the receiving antenna is configured to:
   harvest electromagnetic energy having a low frequency at or below 60 MHz at an efficiency above 90% when aligned center-to-center with the transmitting antenna, and
   harvest electromagnetic energy having a low frequency at or below 60 MHz at an efficiency above 85% when misaligned center-to-center with the transmitting antenna by approximately 5 mm.

3. The near-field charging system of claim 2, wherein:
   the first meandering pattern is a first spiral pattern with a first number of revolutions; and
   the second meandering pattern is a second spiral pattern with a second number of revolutions, the second number of revolutions being less than the first number of revolutions.

4. The near-field charging system of claim 3, wherein:
   the first spiral pattern is a planar rectangular spiral; and
   the second spiral pattern is a planar rectangular spiral.

5. The near-field charging system of claim 1, wherein:
   the transmitting antenna further comprises a first via configured to feed radio frequency (RF) signals to the first antenna; and
   the receiving antenna further comprises a second via configured to transfer energy harvested by the second antenna to the power-conversion circuitry.

6. The near-field charging system of claim 5, wherein:
   the first via is positioned at a center of the first substrate; and
   the second via is offset in at least one direction from a center of the second substrate.

7. The near-field charging system of claim 6, wherein:
the first substrate has a first thickness; and
the second substrate has a second thickness that is less than the first thickness.

8. The near-field charging system of claim 1, wherein:
the first antenna has a first width; and
the second antenna has a second width that is greater than the first width.

9. The near-field charging system of claim 8, wherein:
the first antenna comprises a first plurality of antenna elements; and
at least one antenna element of the first plurality of antenna elements has a third width that is less than the first width.

10. The near-field charging system of claim 9, wherein:
the second antenna comprises a second plurality of antenna elements; and
at least one antenna element of the second plurality of antenna elements has a fourth width that is less than the second width and greater than the third width.

11. The near-field charging system of claim 10, wherein the transmitting antenna is configured to transmit electromagnetic energy having a frequency between 30 MHz and 50 MHz.

12. The near-field charging system of claim 11, wherein the transmitting antenna is configured to transmit electromagnetic energy having a frequency at 40 MHz.

13. A near-field charging system for wirelessly charging electronic devices using electromagnetic energy having a low frequency, the near-field charging system comprising:
a pair of asymmetric antennas, including: (i) a transmitting antenna and (ii) a receiving antenna,
wherein:
the transmitting antenna is configured to transmit electromagnetic energy having a low frequency at or below 60 MHz to the receiving antenna at an efficiency above 90%;
the receiving antenna is coupled to power-conversion circuitry for converting the electromagnetic energy into usable power for charging or powering an electronic device that is coupled to the receiving antenna and the power-conversion circuitry;
the second antenna positioned on a substrate including opposing first and second surfaces, whereby the second antenna is coupled to the first surface; and
the receiving antenna further comprises a parasitic element, coupled to the second surface of the substrate, adapted to disrupt energy field distributions around the receiving antenna.

14. The near-field charging system of claim 13, wherein:
an antenna of the transmitting antenna follows a first spiral pattern with a first number of revolutions; and
an antenna of the receiving antenna follows a second spiral pattern with a second number of revolutions, the second number of revolutions being less than the first number of revolutions.

15. The near-field charging system of claim 14, wherein:
the transmitting antenna includes a first via;
the receiving antenna includes a second via; and
when the transmitting antenna is aligned with the receiving antenna, the first via and the second via are axially misaligned.

16. The near-field charging system of claim 15, wherein the pair of asymmetric antennas terminate with different port impedances.

17. The near-field charging system of claim 16, wherein:
the transmitting antenna has a port impedance of approximately 50 ohms, and
the receiving antenna has a port impedance of approximately 5 ohms.

18. A receiving antenna for wirelessly charging electronic devices using electromagnetic energy having a low frequency, the receiving antenna comprising:
a parasitic element shaped to reduce the receiving antenna's sensitivity to misalignment with a corresponding transmitting antenna; and
an antenna element, positioned on top of and electrically isolated from the parasitic element, that follows a spiral pattern,
wherein the receiving antenna is configured to:
harvest electromagnetic energy having a low frequency at or below 60 MHZ at an efficiency above 90% when aligned center-to-center with a corresponding transmitting antenna; and
harvest electromagnetic energy having a low frequency at or below 60 MHz at an efficiency above 85% when misaligned center-to-center with the corresponding transmitting antenna by approximately 5 mm.

19. The receiving antenna of claim 18, wherein the parasitic element is rectangular or circular shaped.

* * * * *

UNITED STATES PATENT AND TRADEMARK OFFICE
CERTIFICATE OF CORRECTION

| | |
|---|---|
| PATENT NO. | : 12,431,735 B2 |
| APPLICATION NO. | : 17/700337 |
| DATED | : September 30, 2025 |
| INVENTOR(S) | : Alister Hoss et al. |

It is certified that error appears in the above-identified patent and that said Letters Patent is hereby corrected as shown below:

On the Title Page

On Page 12, Column 1, item (56) Other Publications, Line 1, delete "UWB-Antanna," and insert --UWB-Antenna,-- therefor.

In the Specification

In Column 10, Line 31, Detailed Description, delete "110 110" and insert --110-- therefor.
In Column 13, Line 10, Detailed Description, delete "I2C" and insert --$I^2C$-- therefor.
In Column 13, Line 18, Detailed Description, delete "150." and insert --151.-- therefor.
In Column 17, Line 44, Detailed Description, delete "D'" and insert --$D^1$-- therefor.
In Column 27, Line 20, Detailed Description, after "true]'"", delete "r".
In Column 27, Line 21, Detailed Description, after "true]'"", delete "or".

In the Claims

In Column 29, Line 38, in Claim 13, delete "90%:" and insert --90%;-- therefor.
In Column 30, Line 37, in Claim 18, delete "MHZ" and insert --MHz-- therefor.

Signed and Sealed this
Thirteenth Day of January, 2026

John A. Squires
*Director of the United States Patent and Trademark Office*